United States Patent [19]
Mori

[11] Patent Number: 5,493,726
[45] Date of Patent: Feb. 20, 1996

[54] OPERATION GUIDANCE GENERATING UNIT AND METHOD OF GENERATING OPERATION GUIDANCE

[75] Inventor: Toshiya Mori, Settsu, Japan

[73] Assignee: Matsushita Electric Industrial Co., Ltd., Osaka, Japan

[21] Appl. No.: 189,068

[22] Filed: Jan. 28, 1994

[30] Foreign Application Priority Data

Jan. 29, 1993 [JP] Japan .................................. 5-013933

[51] Int. Cl.6 .................................................. G06F 15/60
[52] U.S. Cl. ........................... 395/161; 395/152; 395/155
[58] Field of Search ............................... 395/152, 155, 395/156, 157, 158, 159, 161, 650, 700

[56] References Cited

U.S. PATENT DOCUMENTS

| | | | |
|---|---|---|---|
| 5,121,497 | 6/1992 | Kerr et al. | 395/650 |
| 5,235,679 | 8/1993 | Yoshizawa et al. | 395/156 |
| 5,307,456 | 4/1994 | Mackay | 395/154 |
| 5,377,319 | 12/1994 | Kitahara et al. | 395/161 |
| 5,388,993 | 2/1995 | McKiel et al. | 434/118 |
| 5,434,963 | 7/1995 | Kuwamoto et al. | 395/155 |

FOREIGN PATENT DOCUMENTS

| | | |
|---|---|---|
| 61-91775 | 5/1986 | Japan . |
| 1108681 | 4/1989 | Japan . |
| 1216483 | 8/1989 | Japan . |
| 1243183 | 9/1989 | Japan . |
| 2216588 | 8/1990 | Japan . |
| 2289077 | 11/1990 | Japan . |

Primary Examiner—Mark R. Powell
Assistant Examiner—Ba Huynh
Attorney, Agent, or Firm—Price, Gess & Ubell

[57] ABSTRACT

The present invention provides an operation guidance generating unit, in which data necessary to generate a guidance display are stored in a guidance description unit, an object data unit, and a style rule unit. The guidance description unit updates the contents of the display of the guidance in accordance with a procedure a user is to follow. The object data unit stores image data for each element consisting of an image and an image data processing program; the image data for each element are necessary to generate a guidance image. Of all the guidance images generated by the image data stored in the object data unit, the style rule unit stores display format data for an area where a display format is amendable. An automatic guidance generating unit selects certain image data from the object data unit in accordance with each procedure described in the guidance description unit, generating guidance image data by editing the image data based on the display format stored in the style rule unit.

14 Claims, 41 Drawing Sheets

Fig.4

| DATA No. | | | |
|---|---|---|---|
| A | | | MOVE CHARACTER STRING; |
| | | | DISPLAY DATA<br>   EDITOR DISPLAY ; |
| B | B1<br>B2 | | CURRENT STATE DATA<br>   ENTER CHARACTER STRING 1 ; DOCUMENT<br>   ENTER CHARACTER STRING 2 ;<br>   CHARACTER STRING 1 "敬具"(Cordially yours) 3 3 ;<br>   CHARACTER STRING 2 "拝啓,貴社ますます"<br>   (Dear Sirs, We are pleased to) 3 6 ; |
| C | C1<br>C2<br>C3<br>C4<br>C5<br>C6 | | OPERATION DATA<br>   FUNCTION KEY (MOVE) ;<br>   MOVE CURSOR TO MENU (MOVE CHARACTER STRING) ;<br>   EXECUTE KEY ;<br>   SPECIFY CHARACTER STRING 1 ;<br>   MOVE CURSOR TO (5 8) ;<br>   EXECUTE KEY ; |

| |
|---|
| MOVE CHARACTER STRING: |
| CHARACTER : MING-CHO TYPEFACE  18 POINTS ; |
| BOLD FRAME : FUNCTION KEY MOVE ;<br>　　　: SHAPE RECTANGLE ; |
| CURSOR DISPLAY ; LOCATION (5, 20) ; |
| if (No. OF LINES CURSOR HAS MOVED<0)<br>　　　REVERSED BACKGROUND CURSOR UP ;<br>else if (No. OF LINES CURSOR HAS MOVED>0)<br>　　　REVERSED BACKGROUND CURSOR DOWN ;<br>else if (No. OF COLUMNS CURSOR HAS MOVED<0)<br>　　　REVERSED BACKGROUND CURSOR RIGHT ;<br>else if (No. OF COLUMNS CURSOR HAS MOVED>0)<br>　　　REVERSED BACKGROUND CURSOR LEFT ;<br>else if |
| CURSOR MOVING SPEED : 3 ; |
| CURSOR MOVING ROUTE ; LINE, COLUMN ; |

| |
|---|
| EDITOR DISPLAY : DOCUMENT-INPUT-EDITOR, EDITOR MENU, CURSOR DISPLAY |
| DOCUMENT-INPUT-EDITOR : obj__edit() ; <br> obj__edit()< <br>     DOCUMENT-INPUT-EDITOR IMAGE DATA DISPLAY ; <br>     DOCUMENT-INPUT-EDITOR PROCESSING PROGRAM ; |
| INITIAL MENU : obj__menu() ; <br> obj__menu()< <br>     INITIAL MENU IMAGE DATA DISPLAY ; <br>     INITIAL MENU PROCESSING PROGRAM ; |
| MOVE MENU : obj__move__menu() ; <br> obj__move__menu()< <br>     MOVE MENU IMAGE DATA DISPLAY ; <br>     MOVE MENU PROCESSING PROGRAM ; |
| COPY MENU : obj__copy__menu() ; <br> obj__copy__menu()< <br>     COPY MENU IMAGE DATA DISPLAY ; <br>     COPY MENU PROCESSING PROGRAM ; |
| DELETE MENU : obj__delete__menu() ; <br> obj__delete__menu()< <br>     DELETE MENU IMAGE DATA DISPLAY ; <br>     DELETE MENU PROCESSING PROGRAM ; |
| STYLING MENU : obj__style__menu() ; <br> obj__style__menu()< <br>     STYLE MENU IMAGE DATA DISPLAY ; <br>     STYLE MENU PROCESSING PROGRAM ; |
| CURSOR DISPLAY : obj__cursor() ; <br> obj__cursor()< <br>     CURSOR DISPLAY IMAGE DATA PROGRAM ; <br>     CURSOR DISPLAY PROCESSING PROGRAM ; |
| MOUSE DISPLAY : obj__mouse() ; <br> obj__mouse()< <br>     MOUSE DISPLAY IMAGE DATA PROGRAM ; <br>     MOUSE DISPLAY PROCESSING PROGRAM ; |

Fig.17
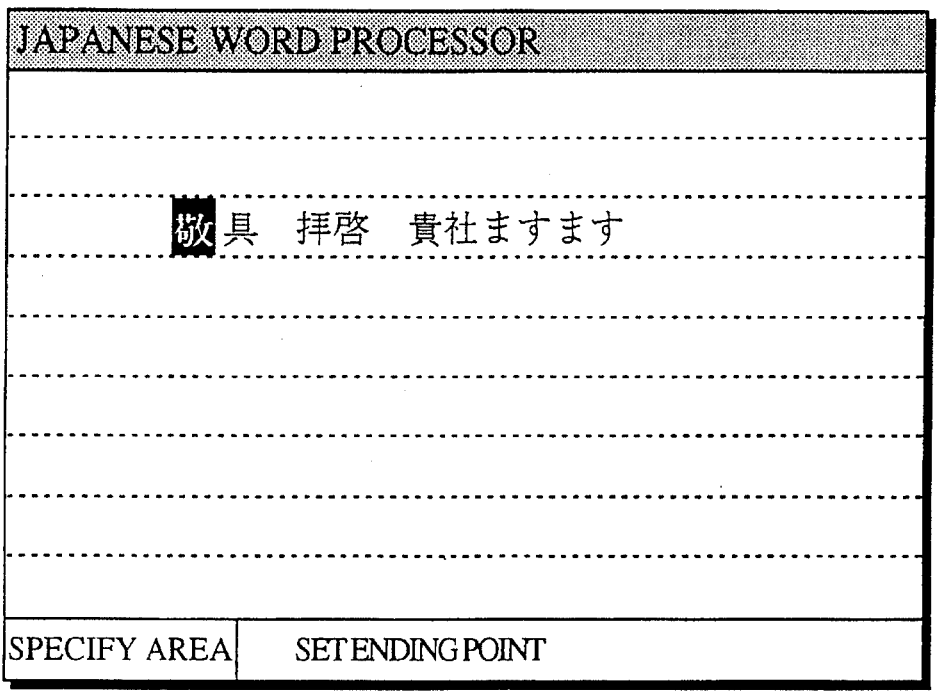
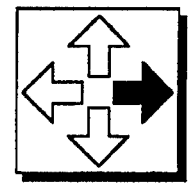
Fig.18
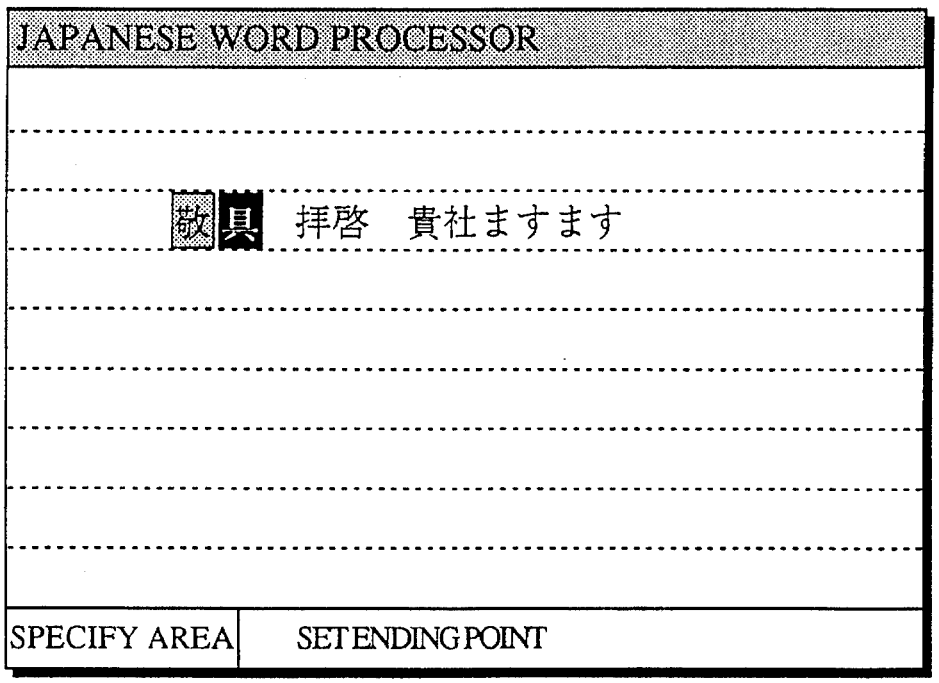
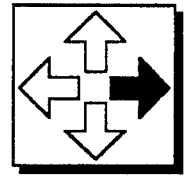

Fig. 24

| DATA No. | | | 301 |
|---|---|---|---|
| A | | | MOVE CHARACTER STRING; <br> DISPLAY DATA <br>   EDITOR DISPLAY ; |
| B | B1 <br> B2 | | CURRENT STATE DATA <br>   ENTER CHARACTER STRING 1 ;  DOCUMENT <br>   ENTER CHARACTER STRING 2 ; <br>   CHARACTER STRING 1 "敬具"(Cordially yours)   3 3 ; <br>   CHARACTER STRING 2 "拝啓,貴社ますます" <br>       (Dear Sirs, We are pleased to)   3 6 ; |
| C | C1 <br> C2 <br> C3 <br> C4 <br> C5 <br> C6 | | OPERATION DATA <br>   FUNCTION KEY (MOVE) <br>     ⟨SELECT MOVE WITH FUNCTION KEY⟩ ; <br>   MOVE CURSOR TO MENU (MOVE CHARACTER STRING) <br>     ⟨SELECT MOVE CHARACTER STRING WITH CURSOR⟩ ; <br>   EXECUTE KEY <br>     ⟨PRESS EXECUTE KEY⟩ ; <br>   SPECIFY CHARACTER STRING 1 <br>     ⟨SET STARTING · ENDINGPOINTS⟩ ; <br>   MOVE CURSOR TO (5 8) <br>     ⟨SPECIFY PLACE FOR RELOCATION⟩ ; <br>   EXECUTE KEY <br>     ⟨PRESS EXECUTE KEY⟩ ; |

| MOVE CHARACTER STRING: |
|---|
| CHARACTER : MING-CHO TYPEFACE  18 POINTS ; |
| MOVE — MESSAGE FONT : MING-CHO TYPEFACE  18 POINTS ;<br>MESSAGE FRAME : SHAPE  RECTANGLE ;<br>: COLOR  BLACK ;<br>: LINE  SOLID ;<br>: LINE  SPACE  2 ;<br>: LOCATION  (LINE-2 , COLUMN+2) ; |
| BOLD FRAME : FUNCTION KEY MOVE ;<br>: SHAPE RECTANGLE ; |
| CURSOR DISPLAY : LOCATION (5, 20) ;<br>if (No. OF LINES CURSOR HAS MOVED<0)<br>    REVERSED BACKGROUND CURSOR UP ;<br>else if (No. OF LINES CURSOR HAS MOVED>0)<br>    REVERSED BACKGROUND CURSOR DOWN ;<br>else if (No. OF COLUMNS CURSOR HAS MOVED<0)<br>    REVERSED BACKGROUND CURSOR RIGHT ;<br>else if (No. OF COLUMNS CURSOR HAS MOVED>0)<br>    REVERSED BACKGROUND CURSOR LEFT ;<br>else if<br>CURSOR MOVING SPEED : 3 ;<br>CURSOR MOVING ROUTE ; LINE.  COLUMN ; |

Fig.29
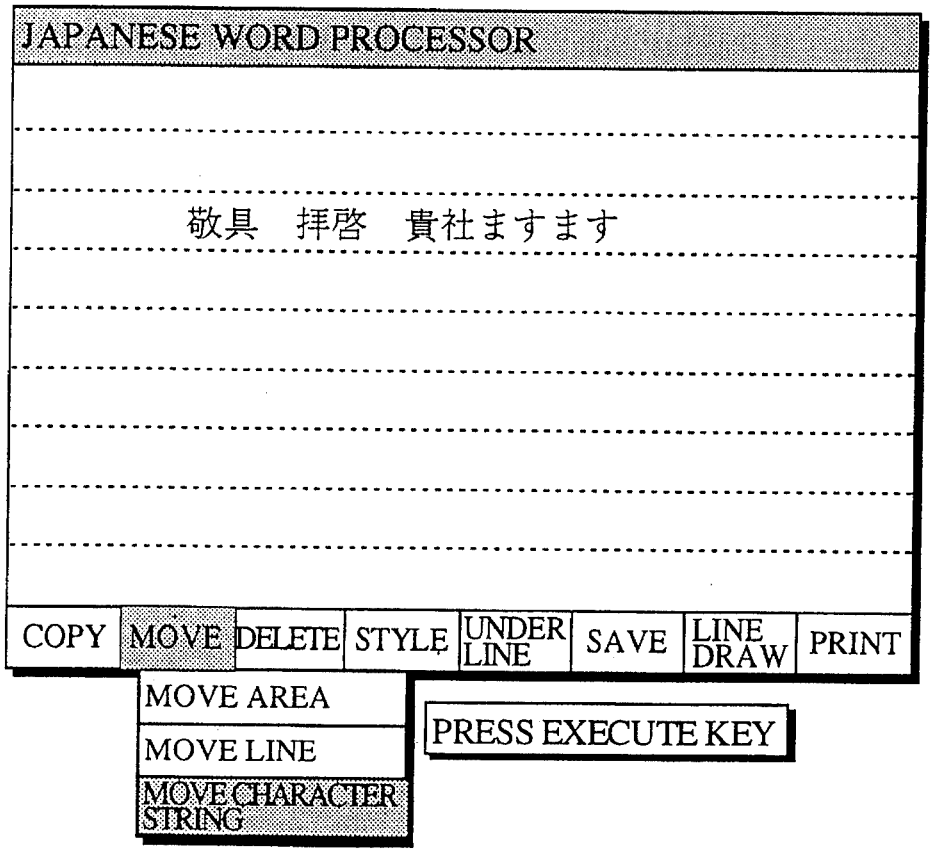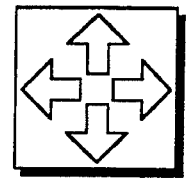
Fig.30
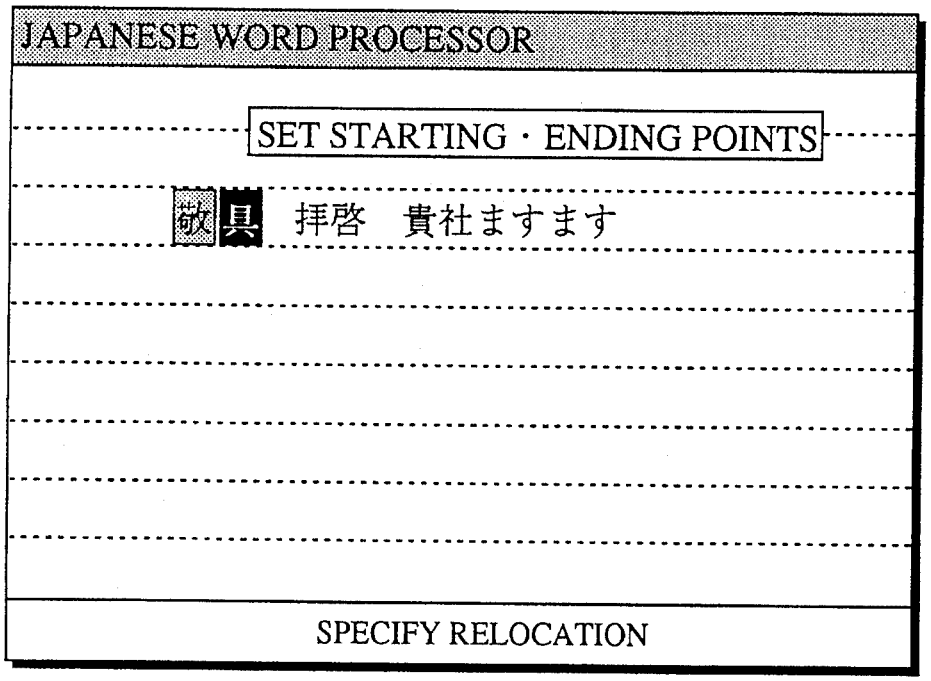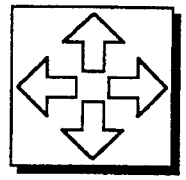

Fig.34

| MOVE CHARACTER STRING: |
|---|
| CHARACTER : MING-CHO TYPEFACE  18 POINTS ; |
| MESSAGE FONT : MING-CHO TYPEFACE  18 POINTS ;<br>MESSAGE FRAME : SHAPE  RECTANGLE ;<br>: COLOR  BLUE ;<br>: LINE  SOLID ;<br>: LINE  SPACE  2 ;<br>: LOCATION  (LINE-2 , COLUMN+2) ;<br>INSIDE MESSAGE FRAME : COLOR  BLUE ; |
| BOLD FRAME : FUNCTION KEY MOVE ;<br>: SHAPE RECTANGLE ; |
| CURSOR DISPLAY : LOCATION (5, 20) ;<br>if (No. OF LINES CURSOR HAS MOVED<0)<br>REVERSED BACKGROUND CURSOR UP ;<br>else if (No. OF LINES CURSOR HAS MOVED>0)<br>REVERSED BACKGROUND CURSOR DOWN ;<br>else if (No. OF COLUMNS CURSOR HAS MOVED<0)<br>REVERSED BACKGROUND CURSOR RIGHT ;<br>else if (No. OF COLUMNS CURSOR HAS MOVED>0)<br>REVERSED BACKGROUND CURSOR LEFT ;<br>else if<br>CURSOR MOVING SPEED : 3 ;<br>CURSOR MOVING ROUTE ; LINE,  COLUMN ; |

Fig.35

```
if ( MONITOR = MONOCHROME ) {

MESSAGE FRAME : COLOR BLACK ;
    INSIDE MESSAGE FRAME : COLOR , CLEAR ;
                         : PATTERN MESH ;
}
if ( INPUT DEVICE = MOUSE ) {
    CURSOR DISPLAY : MOUSE DISPLAY ;
}
if ( SPEECH = YES ) {
    MESSAGE : SPEECH ;
}
```

Fig.36    *402*

| MONITOR : MONOCHROME ; |
| INPUT DEVICE : KEYBOARD ; |
| PRINTER : LINE FEED PRINTER ; |
| SPEECH : NO ; |

Fig.38 MOVE
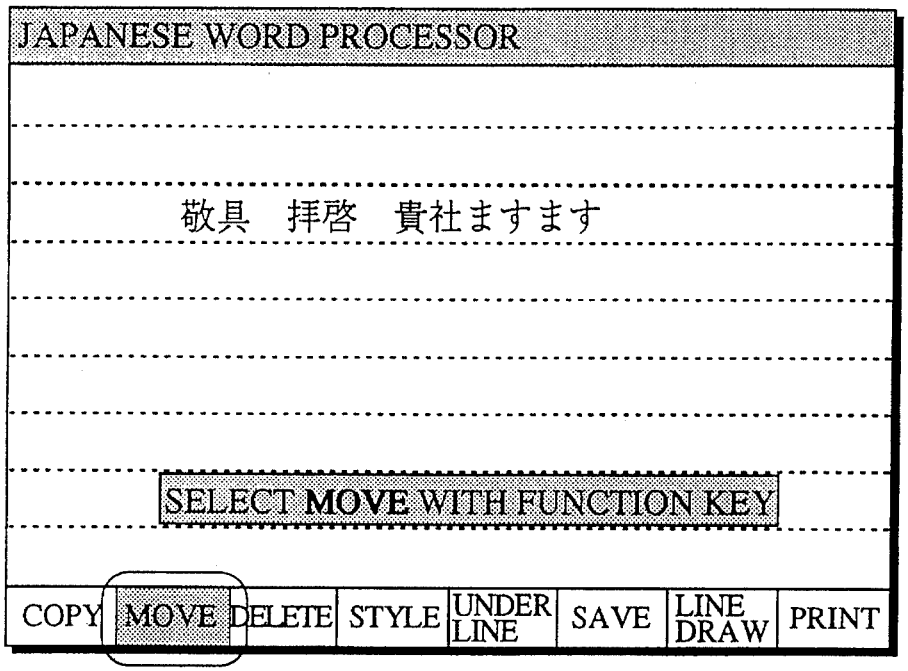
Fig.39
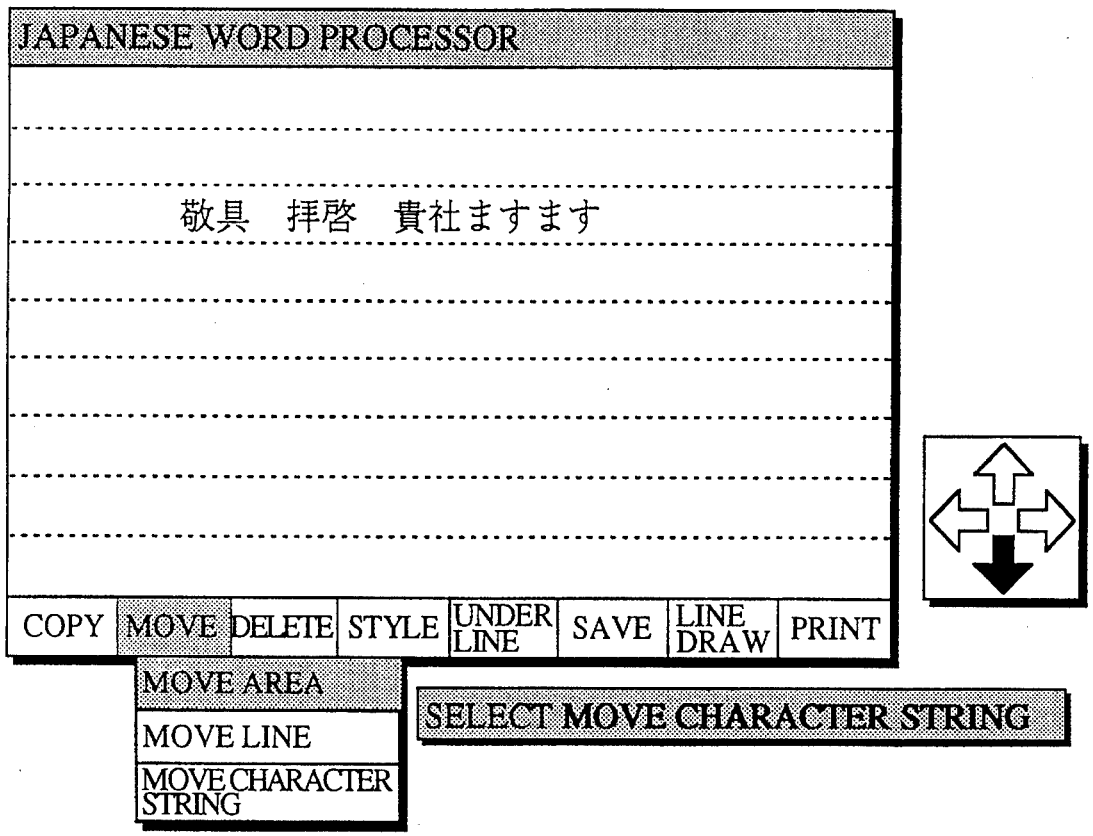

OPERATION GUIDANCE GENERATING UNIT AND METHOD OF GENERATING OPERATION GUIDANCE

BACKGROUND OF THE INVENTION (1) Field of the Invention

The present invention relates to the structure of an operation guidance generating unit which displays an animated procedure of data processors or the like to guide a user, and to a method of generating the operation guidance applied to the operation guidance generating unit.

(2) Description of the Related Arts

The rapid progress in data processing systems provides today's data processors with a variety of functions. However, the operation becomes undesirably complicated as the number of functions increases. Given these circumstances, a data processor capable of displaying operation guidance has been proposed: the operation guidance explains the functions or operation method to a user, so that he can easily operate the data processor.

For example, a document filing system furnished with such an operation guidance display function is disclosed in Japanese Laid-open Patent Application No. 61-91775. FIG. 1 is a block diagram showing the structure of this document filing system. This document filing system stores document data on an optical disc, and the stored document data are retrieved for display. In the following, the operation guidance display function of this document filing system will be particularly explained.

The document filing system comprises an image input unit 101, an image output unit 102, an image input/output control unit 103, an optical disc 104, an optical disc unit 105, an optical disc control unit 106, a stationary disc 107, a floppy disc 108, a disc control unit 109, a display unit 110, a key board 111, a display control unit 112, an image memory 113, a data processing unit 114, an operation guidance readout processing unit 132, a writing processing unit 133 for a spare memory, and a display processing unit 134. These processing units operate in the following way.

First of all, documents showing operation instructions for the user, or documents of operation guidance showing the operation instructions and corresponding images are prepared.

Then, the guidance documents are read under the control of the operation guidance readout processing unit 132. The guidance documents are read with the image input unit 101 as image data. Having been recorded in the image memory 113, the image data are stored into the stationary disc 107. Further, the image data are written into the optical disc 104 under the control of the writing processing unit 133. With the abovedescribed processing, the image data of the operation guidance are stored in the document filing system.

During the operation, the image data of the operation guidance stored in the optical disc 104 are read out at a display command from the user under the control of the display processing unit 134 to be displayed on the screen of the display unit 110 by way of the image memory 113 and display control unit 112. FIG. 2 shows an example of a display of the operation guidance. Operation guidance 250 consists of an operation instruction 251 and an operation image 252. Note that the operation instruction 251 alone or both the operation instruction 251 and operation image 252 can be displayed as the operation guidance.

As has been explained, with the operation guidance display method of the conventional document filing system, the operation instructions and the corresponding images are read to be stored in the form of the image data, and then the image data for the operation guidance are retrieved to be displayed at a request from the user. However, the documents must be prepared in a matching number to the various kinds of the operation guidance. For example, even when the images are identical, another document must be prepared if the operation instructions are different, albeit partially. Further, it is not easy to add, amend, or revise the contents of the guidance; the document-preparation process must be repeated from the start to add or amend the contents. Moreover, a document of animated operation guidance includes numerous pages, making the document preparation process time-consuming.

SUMMARY OF THE INVENTION

Accordingly, the present invention has an object to provide an operation guidance generating unit which facilitates the generation of and the amendment to displayed animated operation guidance.

The present invention has another object to provide a method of generating operation guidance, with which image data of the operation guidance are easily generated and amended.

An operation guidance generating unit of the present invention includes an object (element image) data storage unit which stores standardized images of the operation guidance by dividing the images into a set of individual element image data in a database, and a style rule (format data) storage unit which stores display format data of additional images for highlight-display of an operation in a database. An automatic guidance data generating unit generates certain guidance image data based on the image data selected from the object data storage unit and the style rule selected from the format data storage unit in accordance with display data in a guidance (procedure) description unit, which describes the procedure of an application for a user. The above construction comprises the operation guidance generating unit which facilitates the generation of the operation guidance corresponding to a variety of applications, or the amendment of the operation guidance simply by changing the description in the guidance description unit.

According to another phase of the present invention, in the method of generating the operation guidance, operation instruction data indicating the operation procedure is selected from the guidance description unit. Also, the element image data necessary to generate a guidance display and a graphic display (image data) processing program are selected from the object data storage unit. Further, the display format data are selected from the style rule storage unit. Then, the guidance image data are generated by editing certain image data based on the display format data; these image data are selected from the image data storage unit in accordance with each operation guidance described in the procedure description unit.

According to another phase of the present invention, in the method of generating the operation guidance, the image data for each of the elements comprising of the image, which are necessary to generate a guidance image, and the graphic display processing program have been generated and stored in advance. Of all the animated guidance images generated with the stored image data, the display format data for an area where a display format is amendable have been generated for being stored. Further, the user describes an operation procedure for updating the contents of the display for the guidance in accordance with a procedure the user is to follow. Certain image data are selected from the stored image data in accordance with each operation procedure described, and the guidance image data are generated by editing the selected image data based on the stored display format data.

BRIEF DESCRIPTION OF THE DRAWINGS

These and other objects, advantages and features of the invention will become apparent from the following description thereof taken in conjunction with the accompanying drawings which illustrates specific embodiments of the invention. In the drawings:

FIG. 4 is an illustration showing an example of the contents in a guidance description unit of the operation guidance generating unit of FIG. 3;

FIG. 5 is an illustration showing an example of the contents in a style rule unit of the operation guidance generating unit of FIG. 3;

FIG. 6 is an illustration showing an example of the contents in a graphic display processing unit of the operation guidance generating unit of FIG. 3;

FIG. 17 is a view showing a display of the guidance generated by the operation guidance generating unit of FIG. 3;

FIG. 18 is a view showing a display of the guidance generated by the operation guidance generating unit of FIG. 3;

FIG 24 is an illustration showing an example of the contents in the guidance description unit of the operation guidance generating unit in accordance with the second embodiment of the present invention;

FIG. 25 is an illustration showing an example of the contents in the style rule unit of the operation guidance generating unit of the second embodiment;

FIG. 29 is a view showing a display of the guidance generated by the operation guidance generating unit of the second embodiment;

FIG. 30 is a view showing a display of the guidance generated by the operation guidance generating unit of the second embodiment;

FIG. 34 is an illustration showing an example of the contents in the style rule unit of the operation guidance generating unit of FIG. 33;

FIG. 35 is an illustration showing an example of the contents in a device rule unit of the operation guidance generating unit of FIG. 33;

FIG. 36 is an illustration showing an example of the contents a device data unit of the operation guidance generating unit of FIG. 33;

FIG. 38 is a view showing a display of the guidance generated by the operation guidance generating unit of the third embodiment;

FIG. 39 is a view showing a display of the guidance generated by the operation guidance generating unit of the third embodiment;

DESCRIPTION OF THE PREFERRED EMBODIMENTS

FIRST EMBODIMENT

Figure 1:
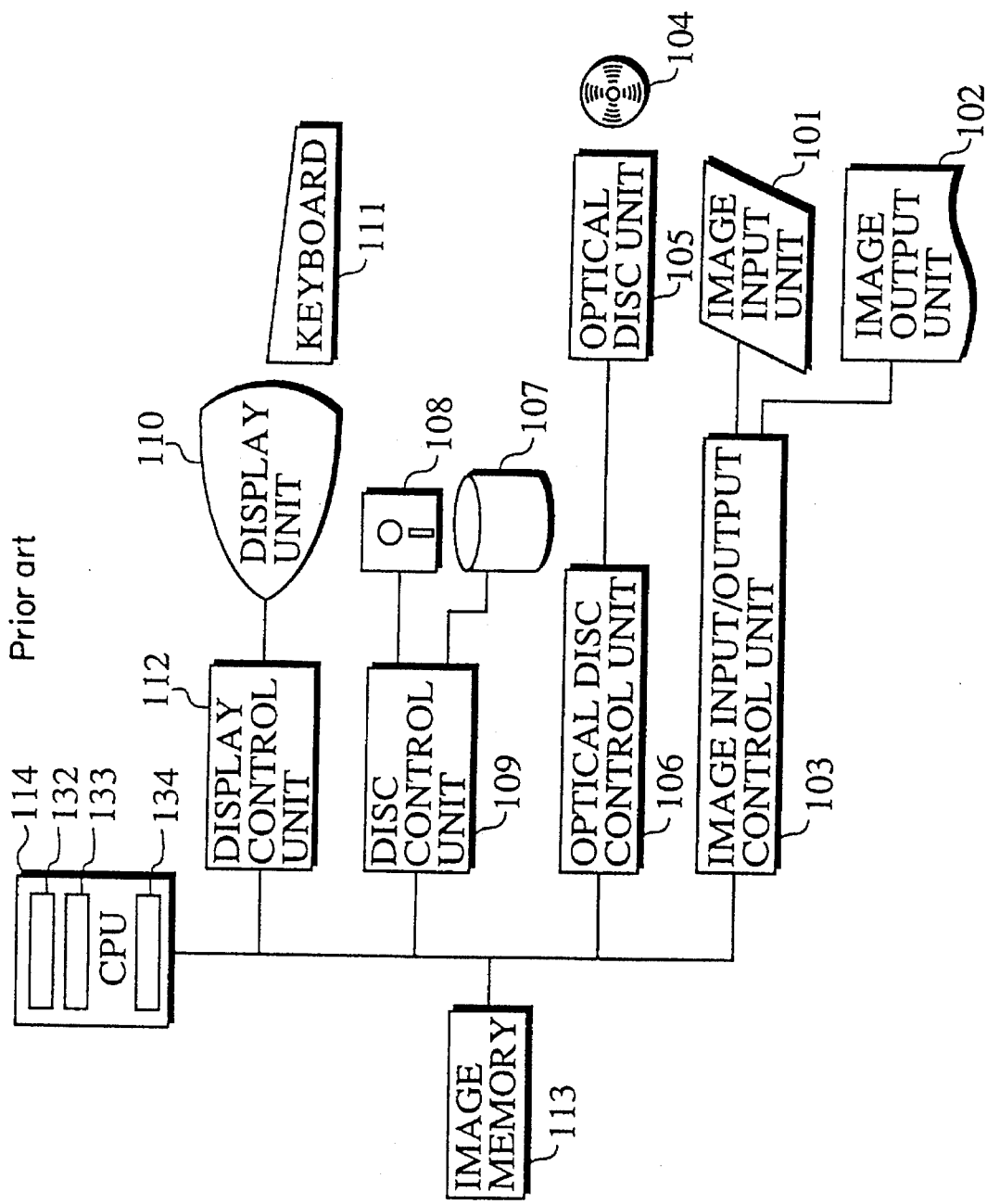
FIG. 1 is a block diagram showing the structure of a document filling system having a conventional operation guidance display function.
Figure 2:
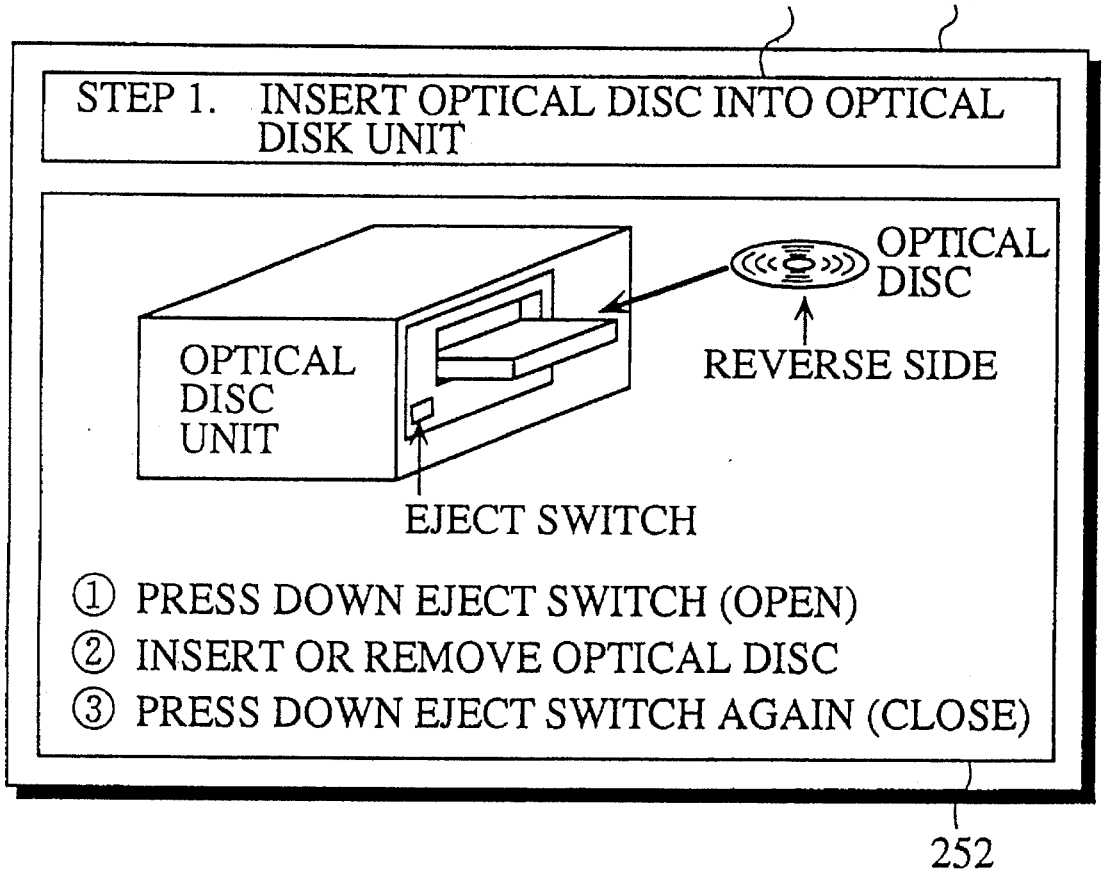
FIG. 2 is a view showing an example of an operation guidance display.
Figure 3:
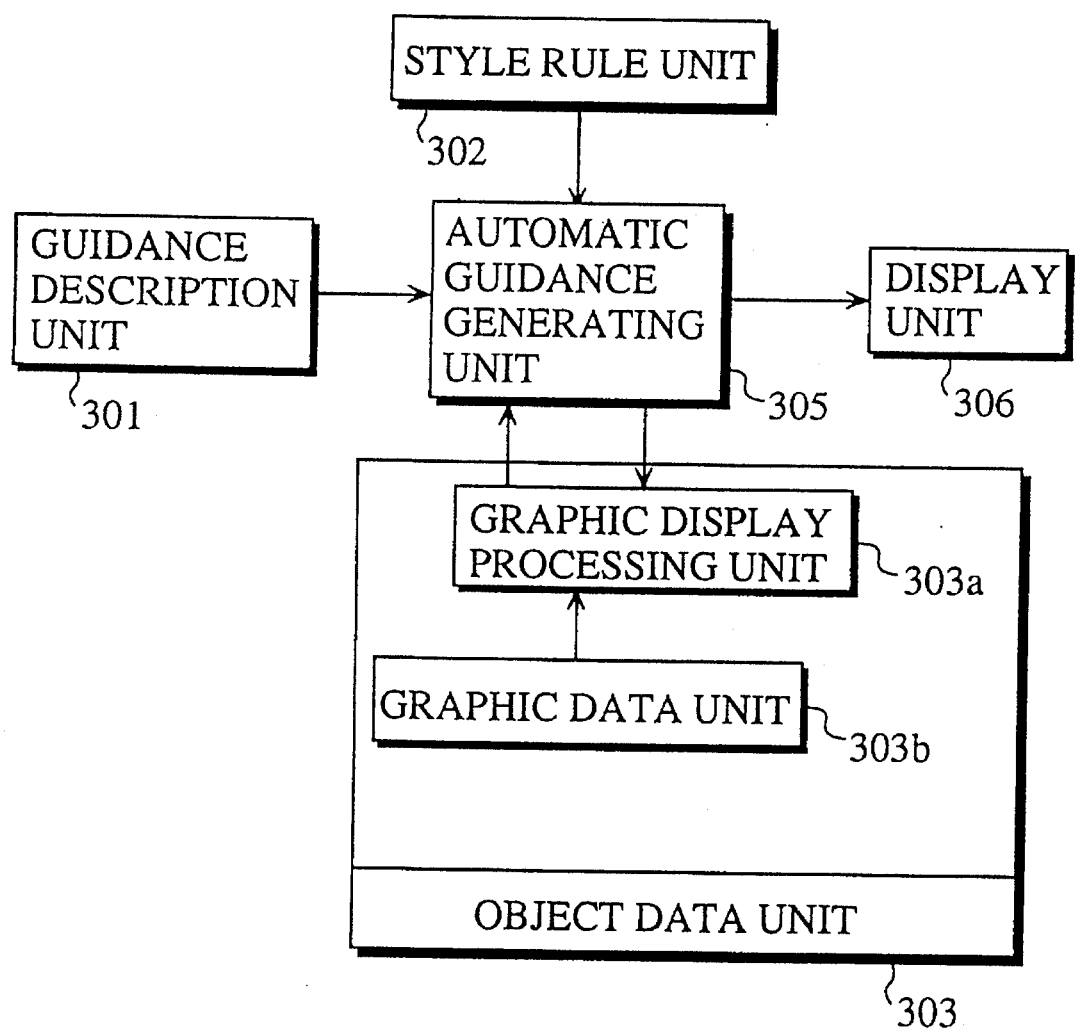
FIG. 3 is a block diagram showing the structure of an operation guidance generating unit in accordance with the first embodiment of the present invention.

FIG. 3 is a block diagram depicting the structure of an animated guidance generating unit(operation guidance generating unit) in accordance with the first embodiment of the present invention, Although the animated guidance generating unit is incorporated in a variety of data processors, only the structure of the animated guidance generating unit is depicted. The "animated guidance" used herein refers to an animation showing the operation of the data processors, and "application" used hereunder means a software applied for the data processors such as a word processor.

The animated guidance generating unit comprises a guidance description unit 301, a style rule unit 302, an object data unit 303, an automatic guidance generating unit 305, and a display unit 306. The object data unit 303 includes a graphic display processing unit 303a and a graphic data unit 303b.

The guidance description unit 301 holds display data, current state data, and operation data in the application being used. The display data are the data relating to the display on which an operation subjected to the operation guidance will be performed; the current state data are the data relating to contents to be displayed as an example; and the operation data are the data relating to descriptions of the operation that a user is going to follow for the current display.

Of all the operation guidance to be displayed on the display unit 306, the style rule unit 302 stores a variety of display conditions for displaying the operation in a clear, concise manner for the user in a database. For example, the data as to a location of a mark representing a cursor or a mouse on the display, a method of display, and whether or not a following instruction should be displayed inside of a bold frame. The bold frame is used to highlight a following menu on the display to attract the user's attention; typically a rectangle or an elliptic is used.

Following is a typical style rule stored in the style rule unit 302:

<RULE FOR DISPLAYING DESCRIPTION>

1) In case of a caution, a frame for the caution should be used and a shape and display color should be specified.

2) In case of an operation instruction, a frame for the operation instruction should be used and a shape and display color should be specified.

3) In case of a title, a frame for the title should be used and a shape and display color should be specified.

4) The display time for the description should be specified.

5) The description of the operation should be displayed at the beginning of the operation.

<RULE FOR EMPHASIZING THE DISPLAY>

1) The display time for the descriptions should be specified.

2) The speed of the cursor should be specified.

3) The route of the cursor should be specified.

4) The bold frame should be used for a display subjected to the operation.

<RULES FOR OPERATION DEPENDING ON DEVICES>

1) An operation method for the cursor(reversed-background-display and a display color) should be specified.

2) An operation method for the mouse(reversed-background-display of a mouse button, display color, and arrows showing the moving direction of the mouse and the display color of the arrows) should be specified.

The object data unit 303 stores image data and an image processing program as object data in a database for the operation guidance display at the display unit 306. The graphic data unit 303b stores the image data which vary with a kind of the operation guidance, while the graphic display processing unit 303a stores an image processing program which changes the contents for a display of graphic data in the graphic data unit 303b in accordance with the data supplied from the guidance description unit 301 and style rule unit 302.

The automatic guidance generating unit 305 reads out the data from the guidance description unit 301 and style rule unit 302 to generate guidance data, which are supplied to the object data unit 303. On the other hand, the automatic guidance generating unit 305 receives the image data from the object data unit 303, which are outputted to the display unit 306.

The display unit 306 displays the guidance data generated by the automatic guidance generating unit 305. The display unit is not limited to a display apparatus; it may be a semiconductor memory, a floppy disc, a hard disc, or an optical disc.

Next, the operation for generating the guidance of the animated guidance generating unit of the first embodiment will be explained. A display for the operation guidance for "MOVE CHARACTER STRING" in a Japanese word processor application will be used as an example in the following.

Figure 7:
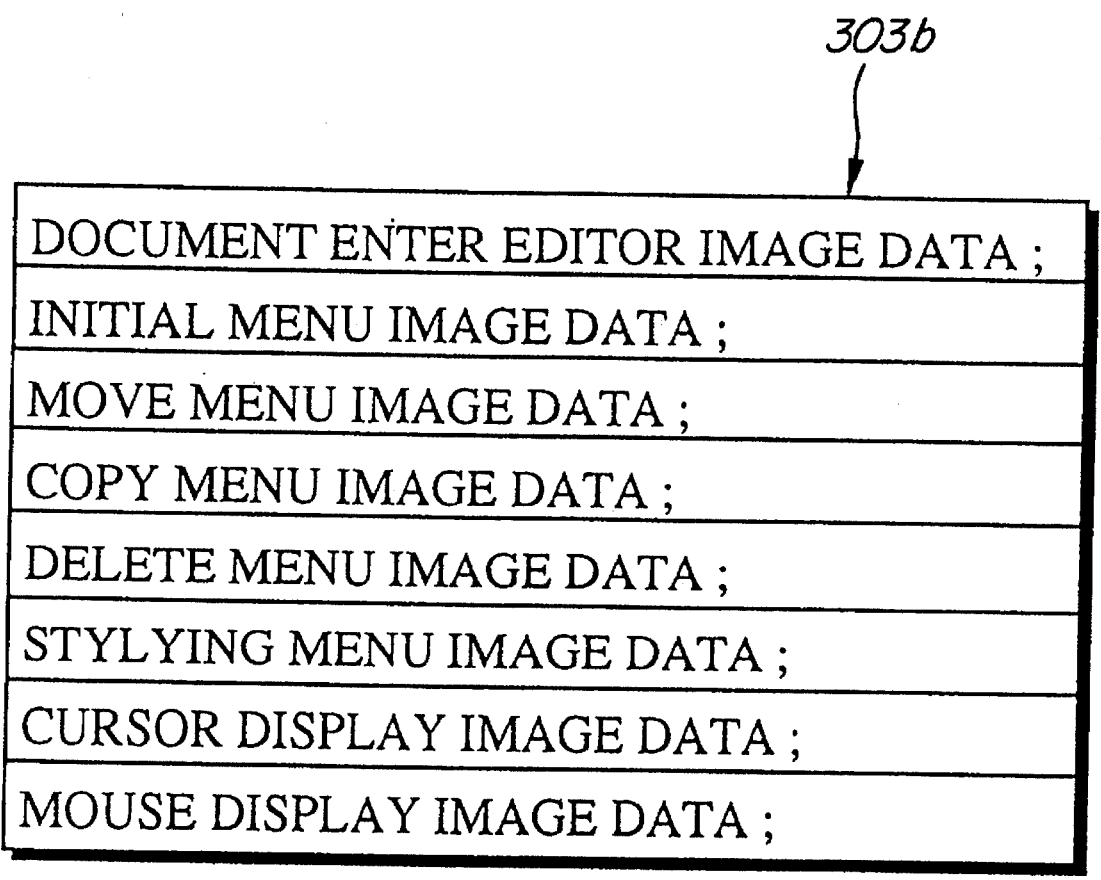
FIG. 7 is an illustration showing an example of the contents in a graphic data unit of the operation guidance generating unit of FIG. 3.

FIG. 4 shows the contents in the guidance description unit 301 for a character-string-moving operation; the Data No. column is shown in the drawing for the use of convenience, but is not actually stored therein. Likewise, FIG. 5 shows the contents of the style rule unit 302; FIGS. 6 and 7 show the contents in the graphic display processing unit 303a and the graphic data unit 303b, respectively.

Figure 8:
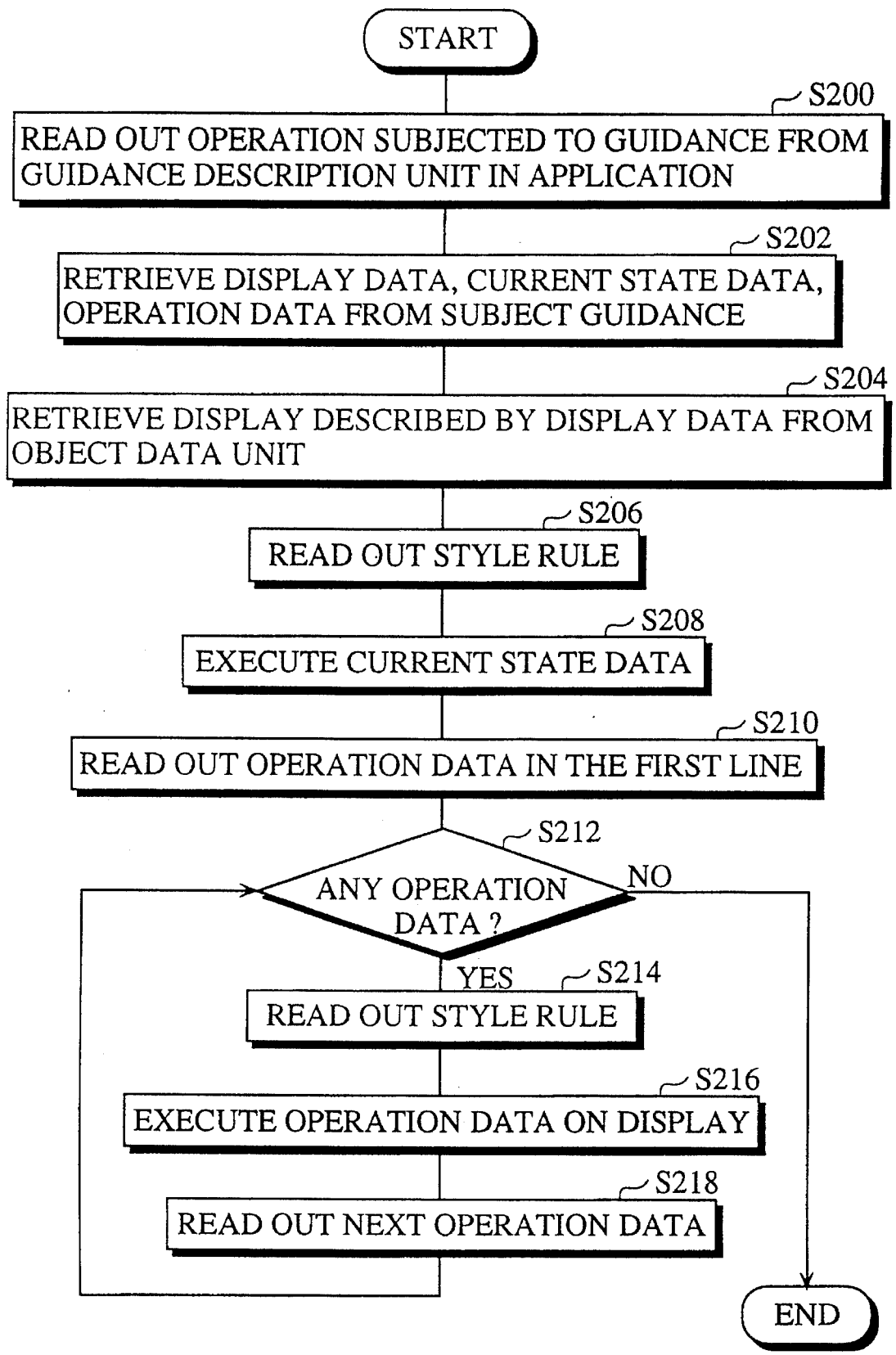
FIG. 8 is a flowchart detailing the operation procedure of the operation guidance generating unit of FIG. 3.

FIG. 8 is a flowchart detailing the procedure of displaying the guidance for the character-string-moving operation.

FIGS. 9–23 show the contents of the guidance displayed on the display unit 306 at each step of the flowchart.

To begin with, the user inputs an instruction to display the operation guidance for the character-string-moving operation in any applicable way.

Upon the receipt of the instruction, the automatic guidance generating unit 305 reads out an item for the character-string-moving operation from the guidance description unit 301(Step 200, FIG. 8). As is shown in FIG. 4, the item includes display data A, current state data B and operation data C, and the data are processed in the alphabetical order(Step 202).

Figure 9:
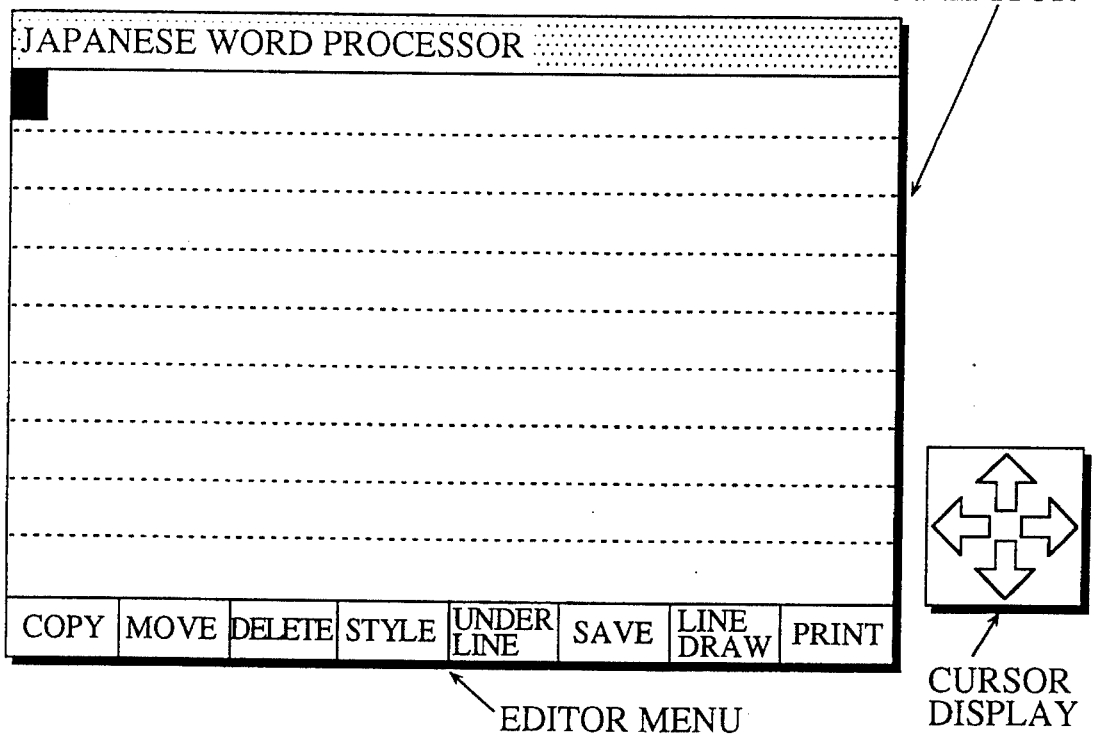
FIG. 9 is a view showing a display of a guidance generated by the operation guidance generating unit of FIG. 3.

First, the display data A are read out(Step 204). The display data A in FIG. 4 exhibit "EDITOR DISPLAY". Thus, the automatic guidance generating unit 305 supplies the data A relating to "EDITOR DISPLAY" to the object data unit 303, which accordingly retrieves an item for "EDITOR DISPLAY" from the graphic display processing unit 303a as is shown in FIG. 6 first, and then proceeds to document-input-editor, input menu, and cursor display processes. The graphic display processing unit 303a generates display image data for "EDITOR DISPLAY" by reading out document-input-editor image data, basic menu image data and cursor display image data from the graphic data unit 303b shown in FIG. 7. The display image data for "EDITOR DISPLAY" thus generated are outputted from the automatic guidance generating unit 305 to the display unit 306 for display, an example of which is shown in FIG. 9.

Figure 10:
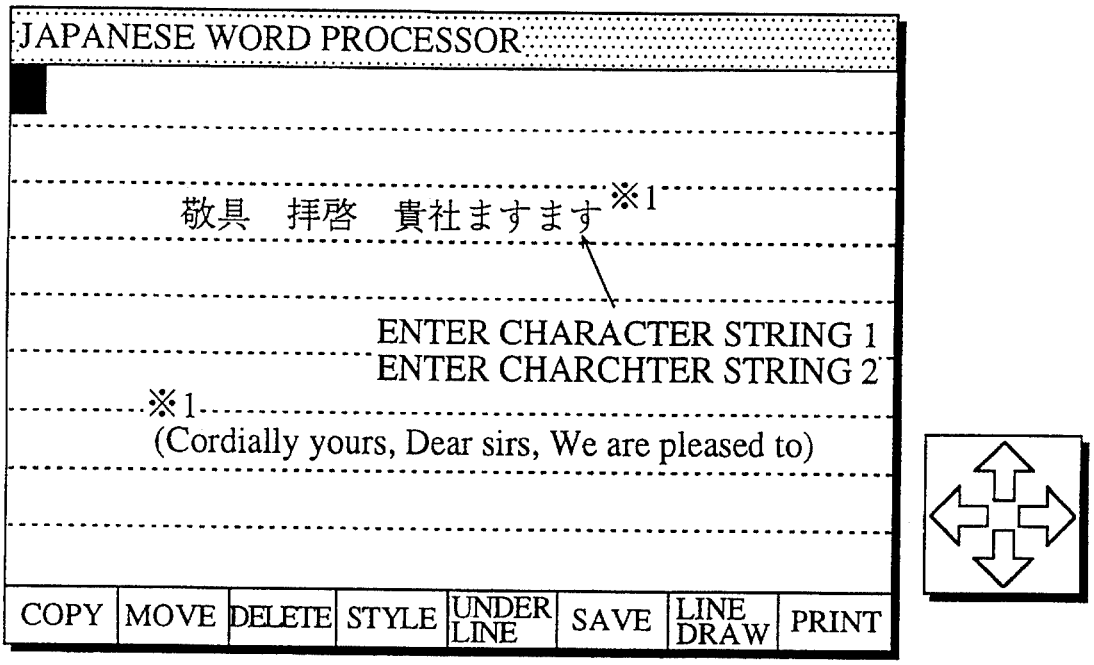
FIG.10 is a view showing a display of the guidance generated by the operation guidance generating unit of FIG. 3.

Next, the current state data B are read out. The state data B1 indicate that a character string 1 is to be entered in the document-input-editor. Further, the character string 1 represents 敬具 (English equivalent: Cordially Yours), and locates in the third line from the top and third column from the left, (3 3). In other words, an instruction to enter 敬具 at (3 3) is described. When entering the character string 1, whether there is any description for entering the characters in "MOVE CHARACTER STRING" in the style rule unit 302 (Step 206) is checked. As is shown in FIG. 5, the item for "MOVE CHARACTER STRING" in the style rule unit 302 specifies the Ming-cho typeface in 18 points. Thus, the character string 1 is entered in the Ming-cho typeface in 18 points in the document-input-editor. The same procedure is applied to the character string 2(State data B2). FIG. 10 shows the display image based on the current state data B; it shows that 敬具 拝啓 貴社ますます (English equivalent; Cordially yours, Dear Sirs, We are pleased to) is an example for the character string subjected to "MOVE CHARACTER STRING" in this operation guidance.

Further, the operation data C(C1–C6) are sequentially read out and processes to the graphic display processing unit 303a are carried out(Step 212–Step 218). The operation data C are the data describing the contents of an operation the user is to perform in practice.

Figure 11:
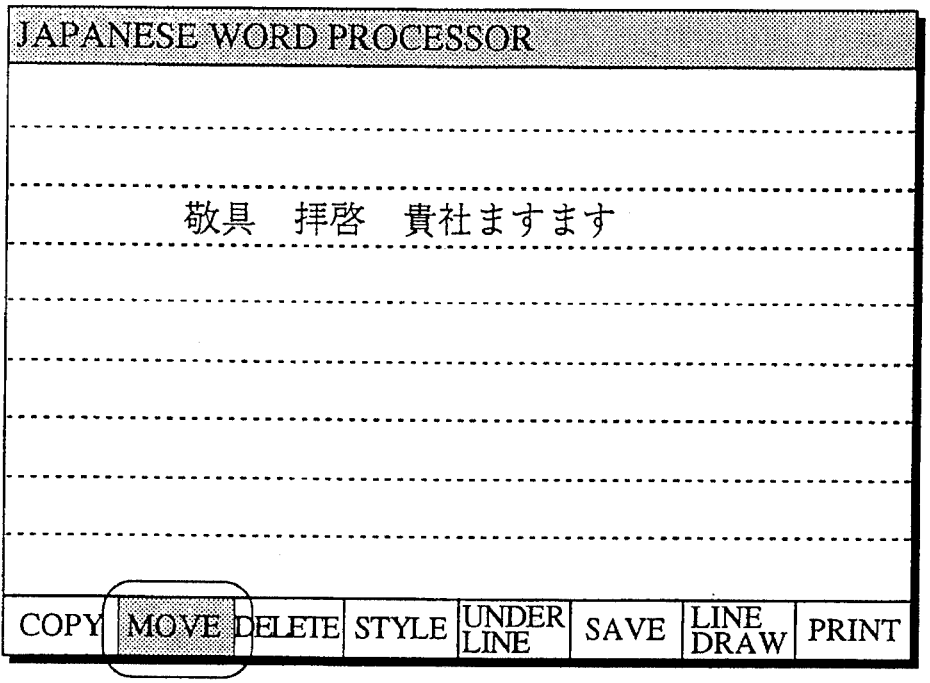
FIG. 11 is a view showing a display of the guidance generated by the operation guidance generating unit of FIG. 3.

As is shown in FIG. 4, the user performs the process of the operation data C1 "PRESS FUNCTION KEY(MOVE)" (Step 212). This corresponds to the user's operation of a function key "MOVE" in practice. "PRESS FUNCTION KEY(MOVE)" is performed in the basic menu shown in FIG. 6. During this process, the style rule shown in FIG. 5 is read out to check whether there is any description as to a display method (Step 214). The style rule specifies a bold rectangular frame. The data of the bold frame are delivered to the graphic display processing unit 303a. The graphic display processing data 303a then generates new image data in accordance with the data specifying the bold frame from the style rule and the operation data C1 from the guidance description unit 301, and the newly generated image data are displayed on the display unit 306 (Step 216). FIG. 11 shows the end display: "MOVE" menu is displayed inside of the bold rectangular frame. For this reason, the user referring to the guidance can easily recognize where "MOVE" menu is displayed. In addition, the graphic display processing unit 303a generates the image data to reverse the display background of "MOVE" menu.

Figure 12:
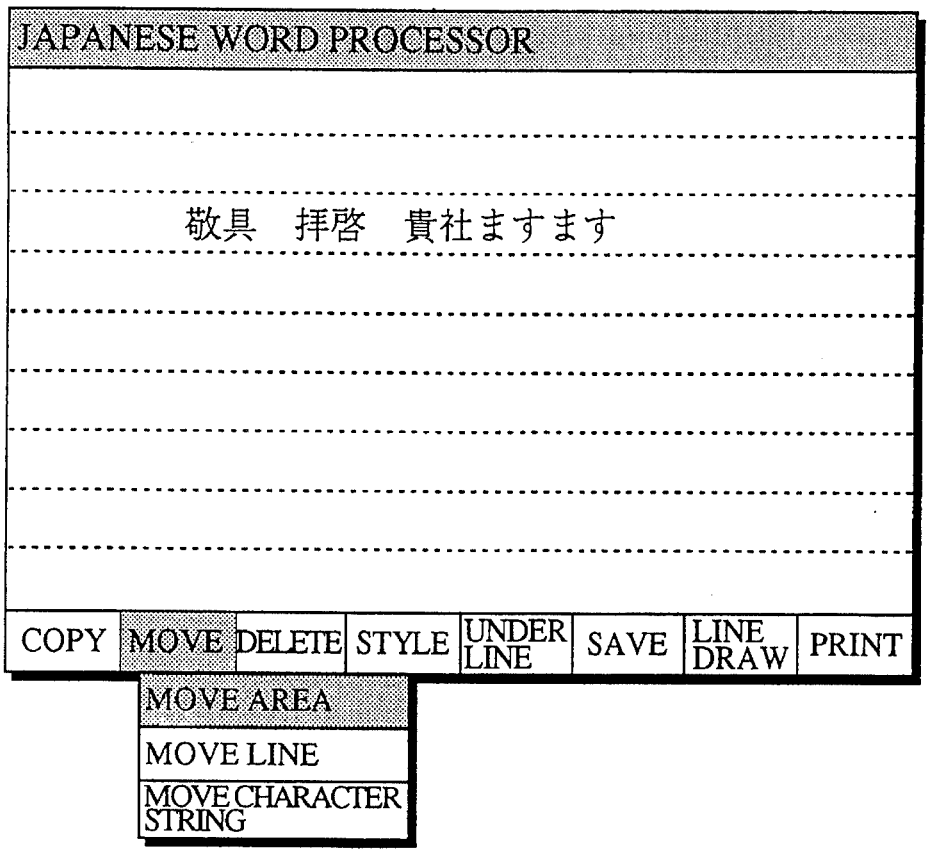
FIG. 12 is a view showing a display of the guidance generated by the operation guidance generating unit of FIG. 3.
Figure 13:
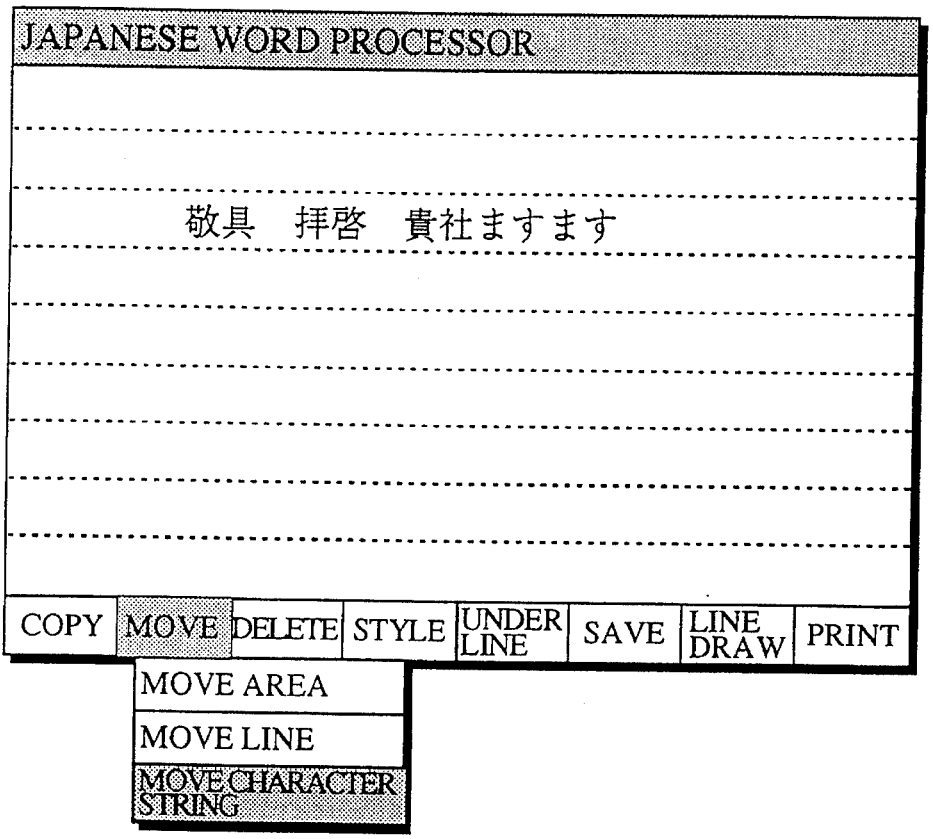
FIG. 13 is a view showing a display of the guidance generated by the operation guidance generating unit of FIG. 3.

Next, the operation data C2 "MOVE CURSOR(MENU-MOVE CHARACTER STRING" are read out. The operation data C2 are the data to display the guidance for an operation to select "MOVE CHARACTER STRING" from the newly displayed "MOVE" menu selections with the cursor after "PRESS FUNCTION KEY(MOVE)" was selected. In the style rule in FIG. 5, the data show that the image of the corresponding cursor for the cursor display should be displayed in reversed background to explain a cursor-moving-operation The graphic display unit 303a generates new image data in accordance with the data from the style rule unit 302 and operation data C2 from the guidance description unit 301, and the newly generated image data are displayed at the display unit 306. FIG. 12 shows the moving direction of the cursor to be operated in reversed background. Because the style rule unit specifies a cursor's line change as positive and the moving direction of the cursor is displayed downward to select "MOVE CHARACTER STRING" on the display, the cursor is displayed in reversed background, or downward, on the cursor display. FIG. 13 shows the state after the cursor has been moved.

Figure 14:
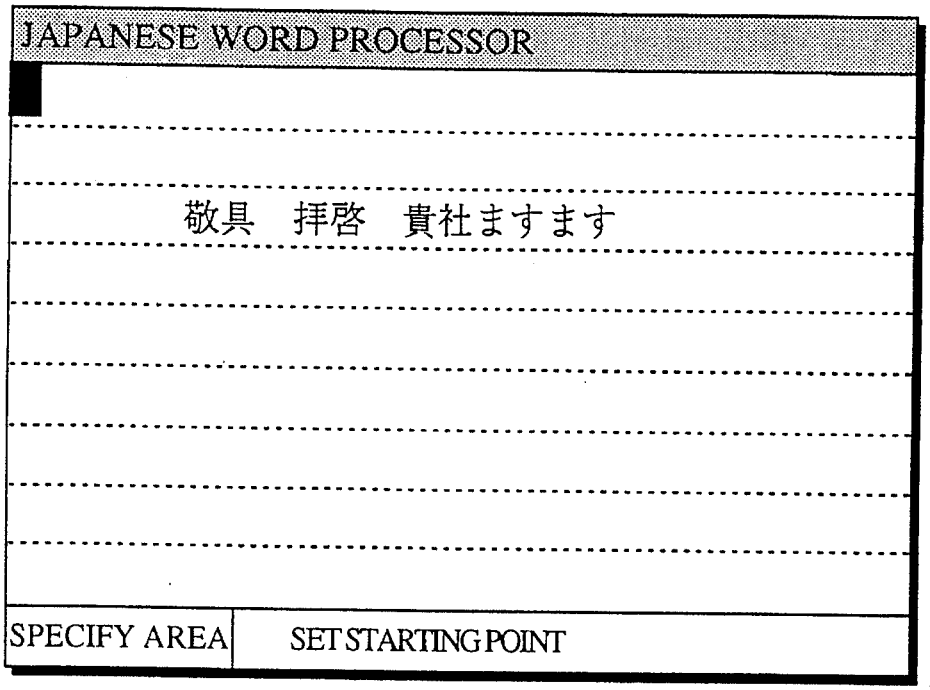
FIG. 14 is a view showing a display of the guidance generated by the operation guidance generating unit of FIG. 3.

Next, the operation data C3 "PRESS EXECUTE KEY" are read out. The operation data C3 are the data to display the guidance for an operation for the user to confirm the selection of "MOVE CHARACTER STRING" by the execution key. The graphic display processing unit 303*a* generates new image data in accordance with the operation data C3, and the newly generated image data are displayed on the display unit 306. FIG. 14 shows the state after "MOVE CHARACTER STRING' menu has been selected.

Figure 15:
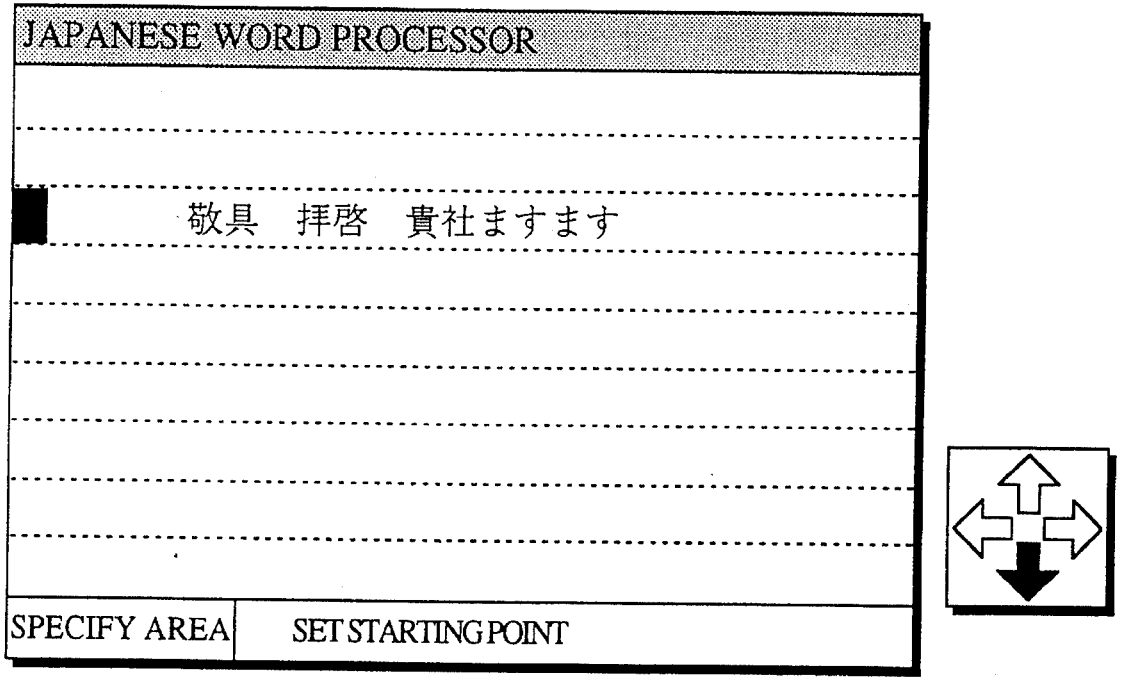
FIG. 15 is a view showing a display of the guidance generated by the operation guidance generating unit of FIG. 3.
Figure 16:
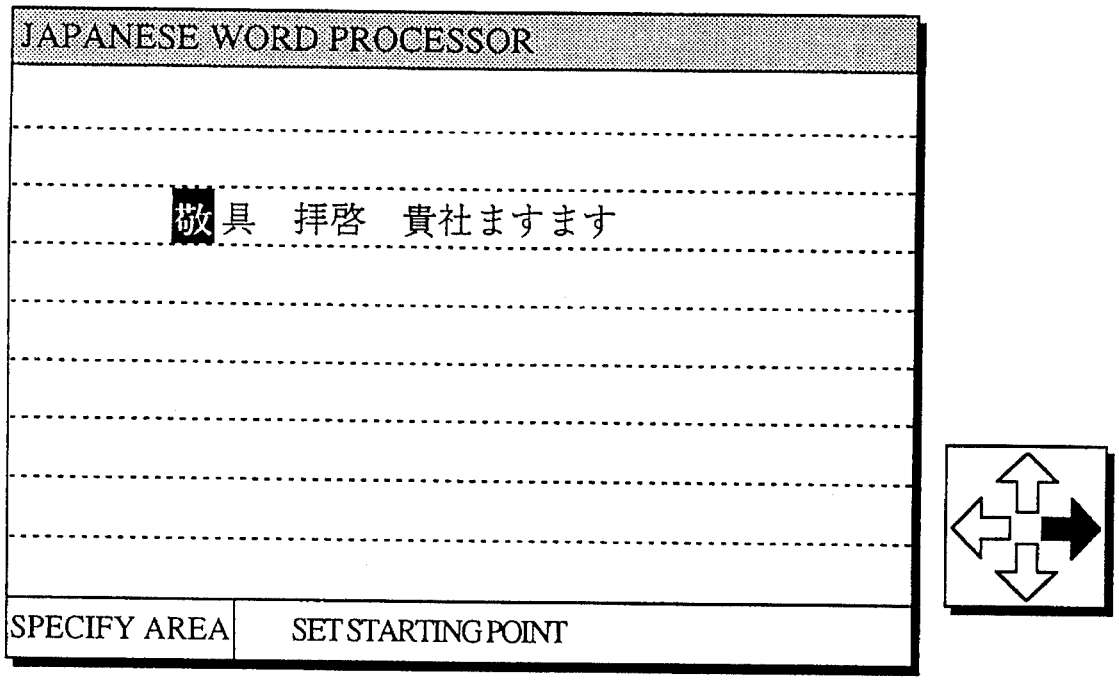
FIG. 16 is a view showing a display of the guidance generated by the operation guidance generating unit of FIG. 3.
Figure 19:
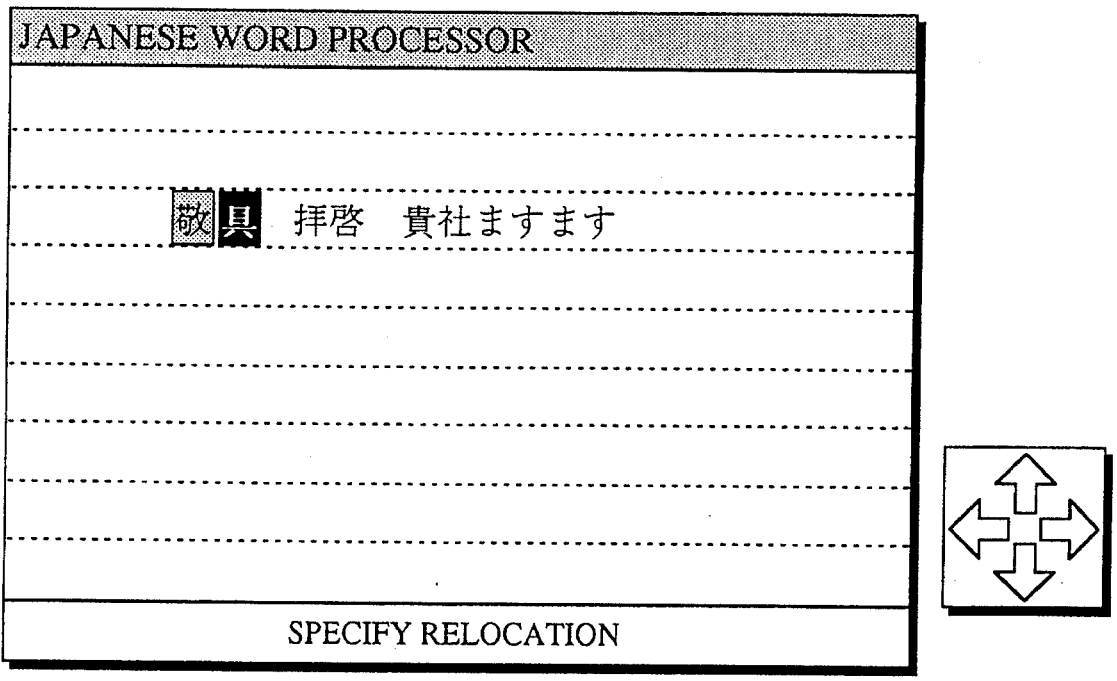
FIG. 19 is a view showing a display of the guidance generated by the operation guidance generating unit of FIG. 3.

Next, the operation data C4 "SPECIFY CHARACTER STRING 1" are read out. The operation data C4 are the data to display the guidance for an operation to specify a character string to be moved. The character string is specified by a sequence of instructions: "MOVE CURSOR TO (3 3)", "PRESS EXECUTE KEY" "MOVE CURSOR TO (3 5)", and "PRESS EXECUTE KEY". In the style rule in FIG. 5, the rule for the cursor's route is described. According to this rule, the cursor is moved by the lines first and then by the column. The graphic display processing unit 303*a* generates new image data representing the state of the moving cursor in accordance with the style rule and the operation data C4, and the newly generated image data are displayed on the display unit 306. FIGS. 15, 16 show the operation to set the starting point of the character string to be move, and FIGS. 17, 18 the ending point. During this point setting process, the cursor is also displayed in reversed background for the reason previously explained.

Figure 20:
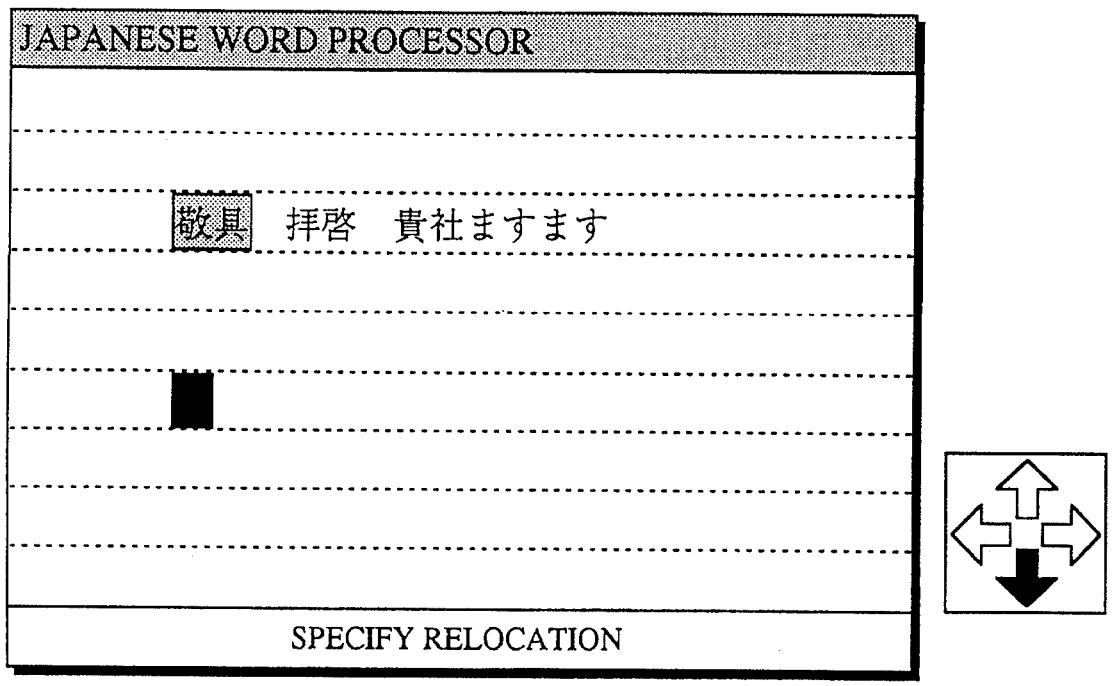
FIG. 20 is a view showing a display of the guidance generated by the operation guidance generating unit of FIG. 3.
Figure 21:
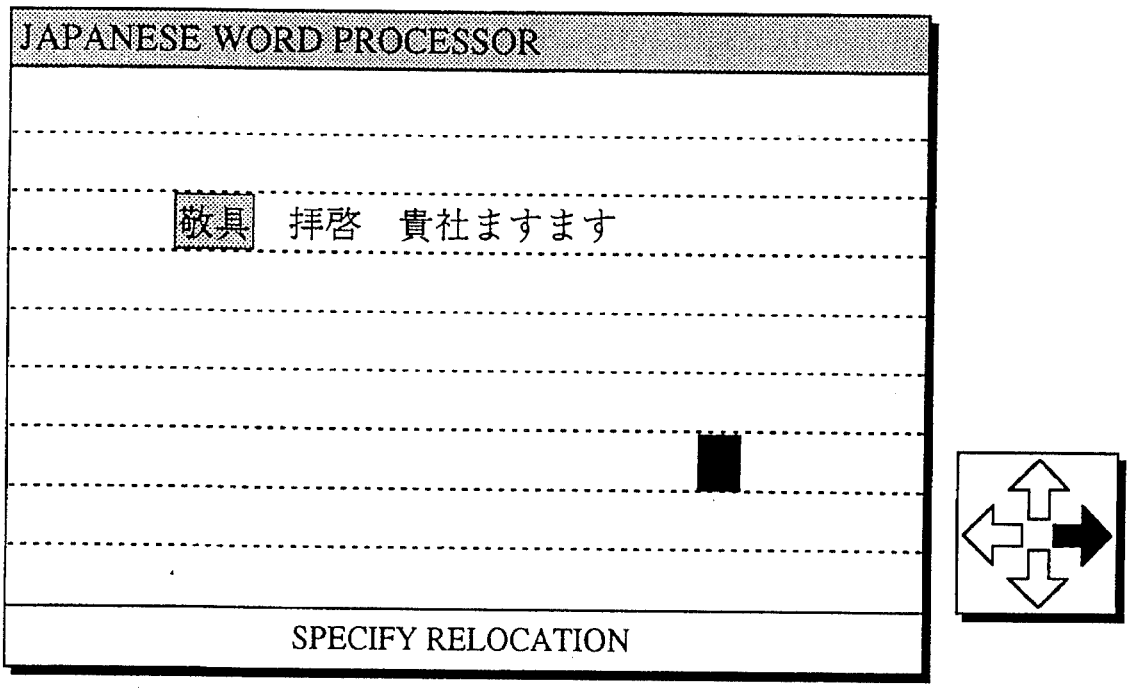
FIG. 21 is a view showing a display of the guidance generated by the operation guidance generating unit of FIG. 3.

Next, the operation data C5 'MOVE CURSOR TO (5 8)" are read out. The operation data C5 are the data to display the guidance for an operation to indicate the place where the character string 1 is relocated. The cursor's moving speed and route are specified in the style rule. The graphic display processing unit 303*a* generates new image data to be moved to (5 8) in accordance with the style rule and operation data C5, and the newly generated image data are displayed on the display unit 306. FIGS. 20, 21 show the end display.

Figure 22:
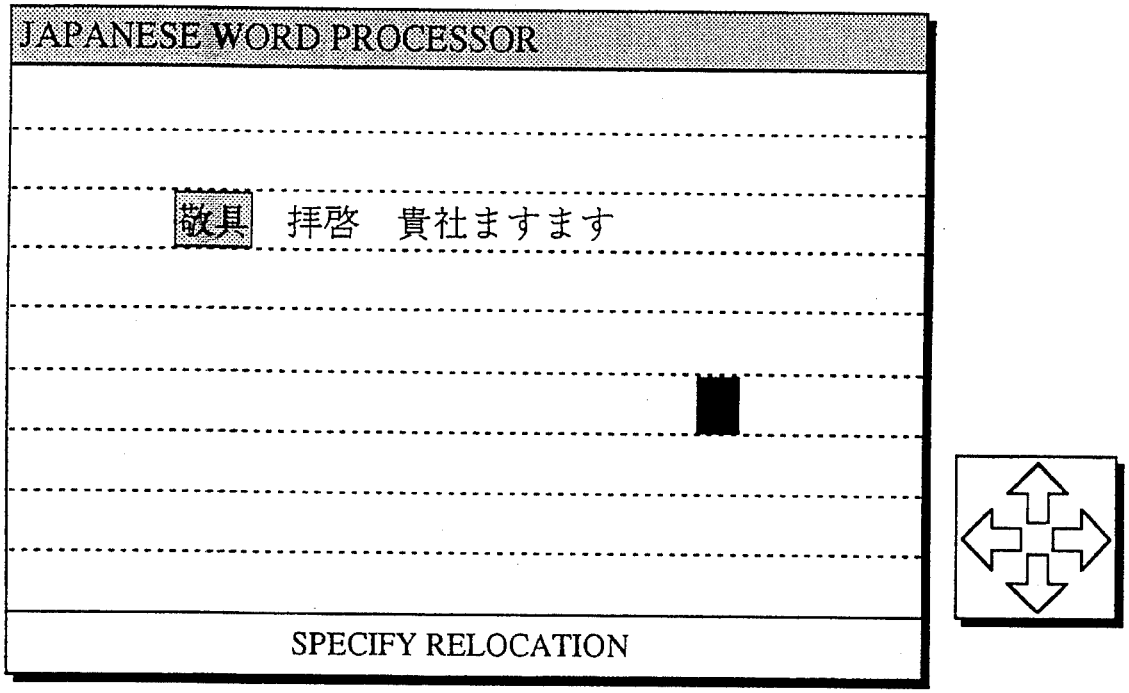
FIG. 22 is a view showing a display of the guidance generated by the operation guidance generating unit of FIG. 3.
Figure 23:
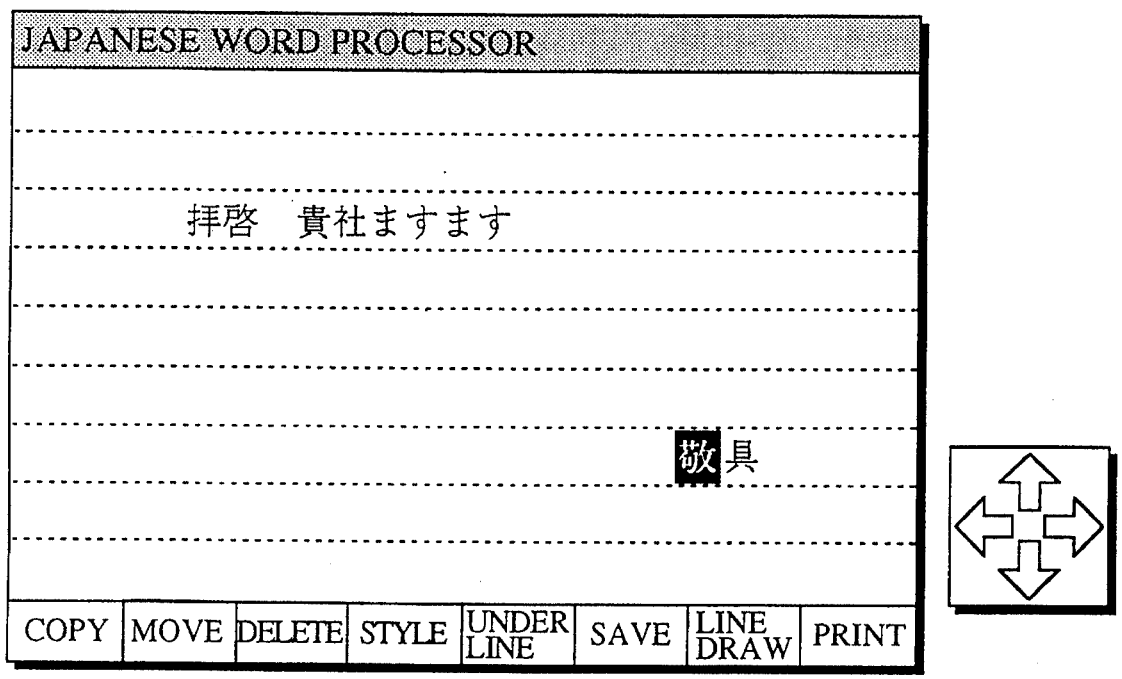
FIG. 23 is a view showing a display of the guidance generated by the operation guidance generating unit of FIG. 3.

Next, the operation data C6 "PRESS EXECUTION KEY" are read out. The operation data C6 are the data to display the guidance for an operation to execute "MOVE CHARACTER STRING". The graphic display processing unit 303*a* generates new image data to be moved to the indicated place in accordance with the operation data C6, and the newly generated image data are displayed on the display unit 306. FIGS. 22, 23 show the state of moving the character string.

The animated guidance for moving the character string 1 to the indicated place is thoroughly displayed on the display unit 306 by the above operations. Therefore, the user can easily take the procedure step by step while confirming the procedure by following the display on the display unit 306.

The animated guidance generating unit of the first embodiment is characterized in that not only can it display the animated guidance, but it can also easily generate, amend or revise the existing guidance. For example, by appropriately amending or revising the data in the guidance description unit 301, the graphic data stored in the object data unit 303 are arbitrarily combined and displayed, and the amendments are displayed as well. Also, by amending the data in the style rule unit 302, the format for displaying the guidance, such as bold frame, reversed-background-display, or operation devices, can be changed easily. For this reason, the animated guidance or animated guidance in a display format for each application can be displayed without generating massive amounts of image data. Moreover, the above construction makes it possible to generate the operation guidance by a guidance developer alone without cooperating with a display image designer, thereby enhancing the work efficiency.

The style rule unit shown in FIG. 5 specifies the rule for "MOVE CHARACTER STRING"; however, it can specify other display formats, or a display format common to all the operations.

SECOND EMBODIMENT

Next, an animated guidance generating unit in accordance with the second embodiment will be explained. Compared with the first embodiment, the operation that the user should take is displayed in the form of messages in the operation guidance. The basic structure of the animated guidance generating unit of the second embodiment is identical with that of the first embodiment. However, the guidance description unit 301 additionally includes message data, and likewise, the style rule unit 302 additionally includes format data for a message display. The structure and operation of the animated guidance generating unit of the second embodiment will be explained in the following. Hereinafter, like components are labeled with like reference numerals with respect to the first embodiment, and the description of these components is not repeated. The character-string-moving operation for the Japanese word processor application is used as the example as was in the first embodiment.

FIG. 24 shows an example of the guidance description unit 301. In the drawing, bracketed sentences in the operation data C are the messages.

FIG. 25 shows an example of the style rule unit 302. In the drawing, the display format data of the messages are described in a message item(message font, message frame).

Figure 26:
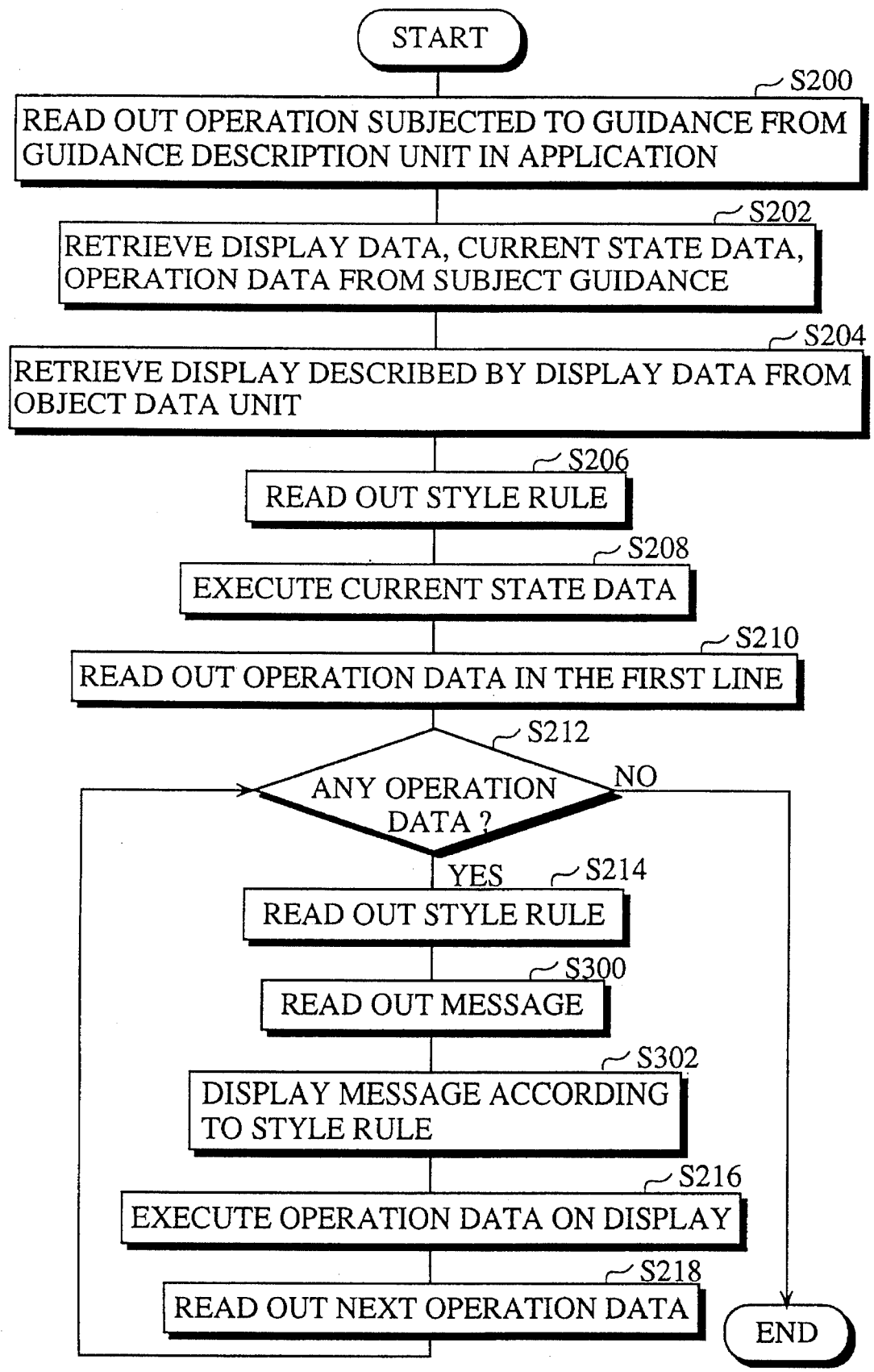
FIG. 26 is a flowchart detailing the operation procedure of the operation guidance generating unit of the second embodiment.

FIG. 26 is a flowchart detailing the operation of the animated guidance generating unit of the second embodiment. Compared with that of the first embodiment in FIG. 8, Steps 300, 302 are different, where the messages are displayed according to the style rule.

Figure 27:
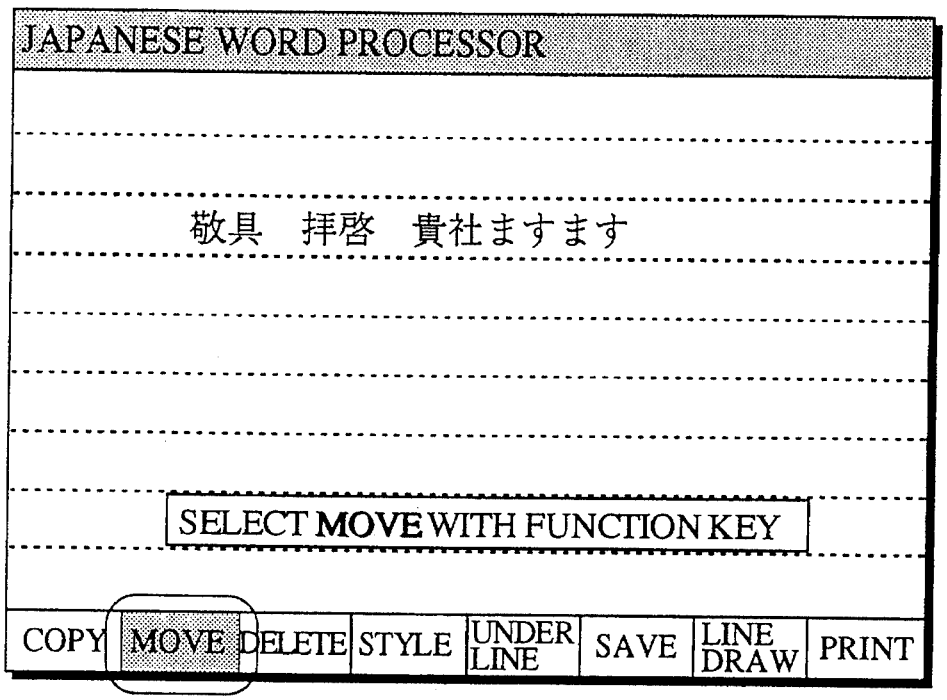
FIG. 27 is a view showing a display of the guidance generated by the operation guidance generating unit of the second embodiment.
Figure 28:
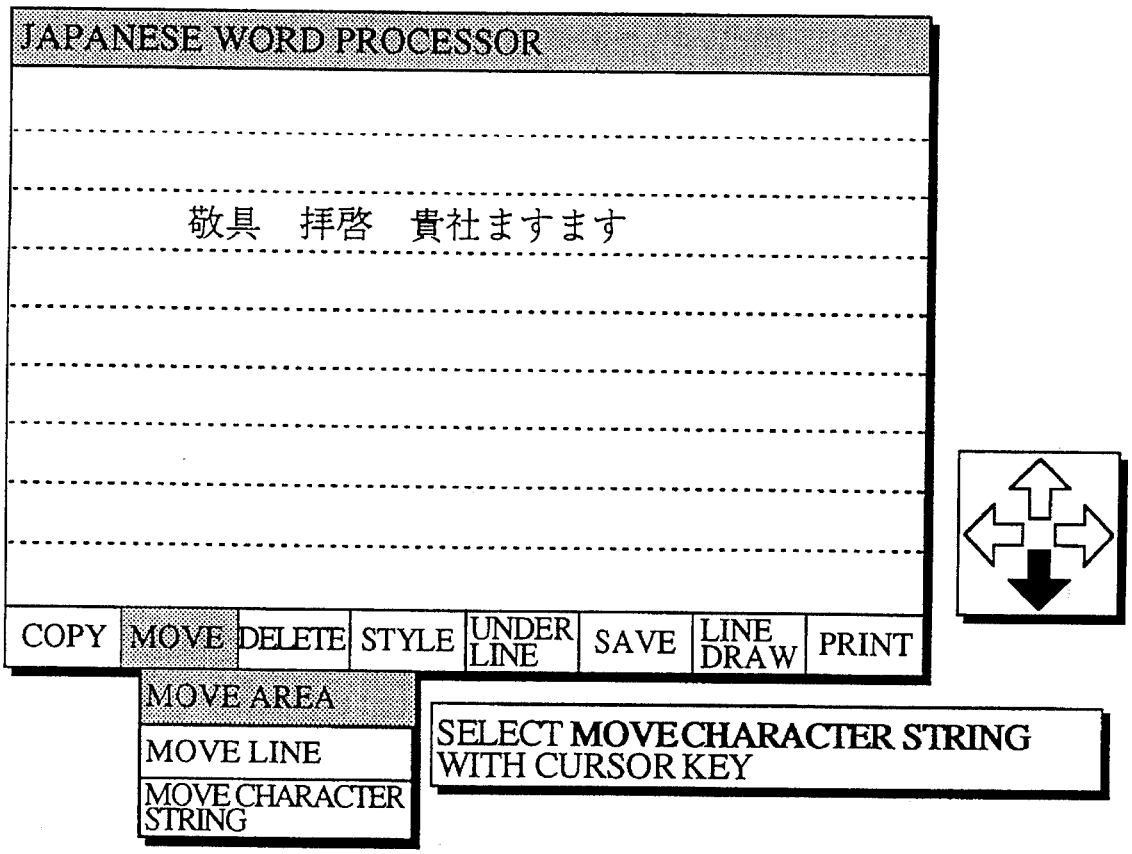
FIG. 28 is a view showing a display of the guidance generated by the operation guidance generating unit of the second embodiment.
Figure 31:
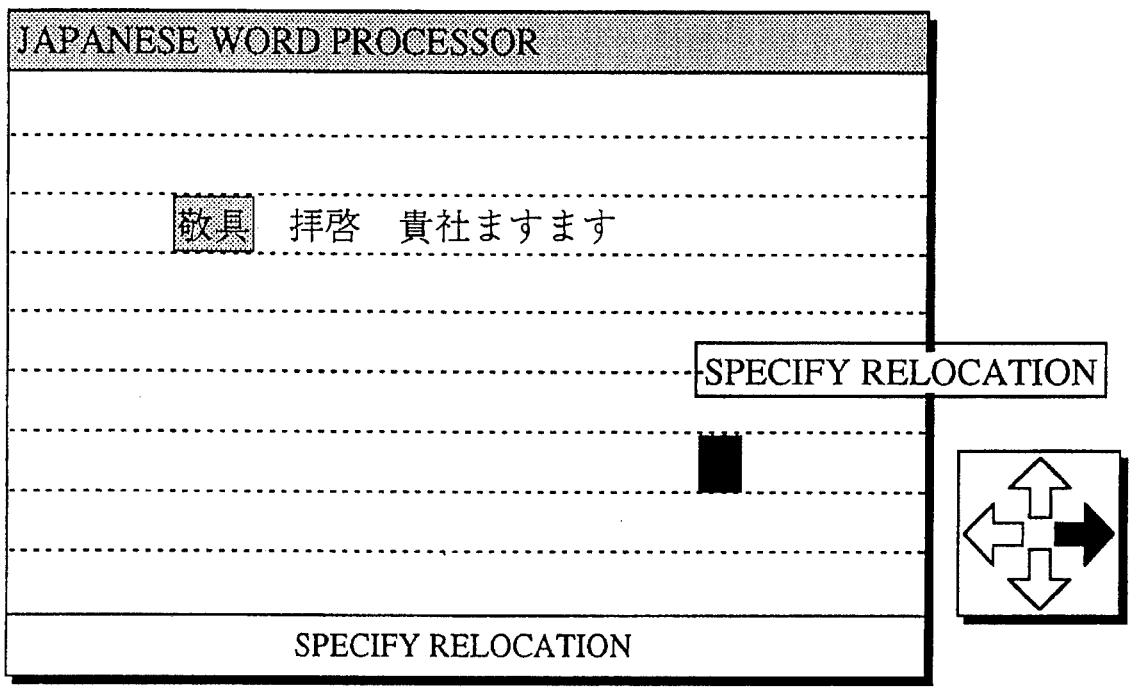
FIG. 31 is a view showing a display of the guidance generated by the operation guidance generating unit of the second embodiment.
Figure 32:
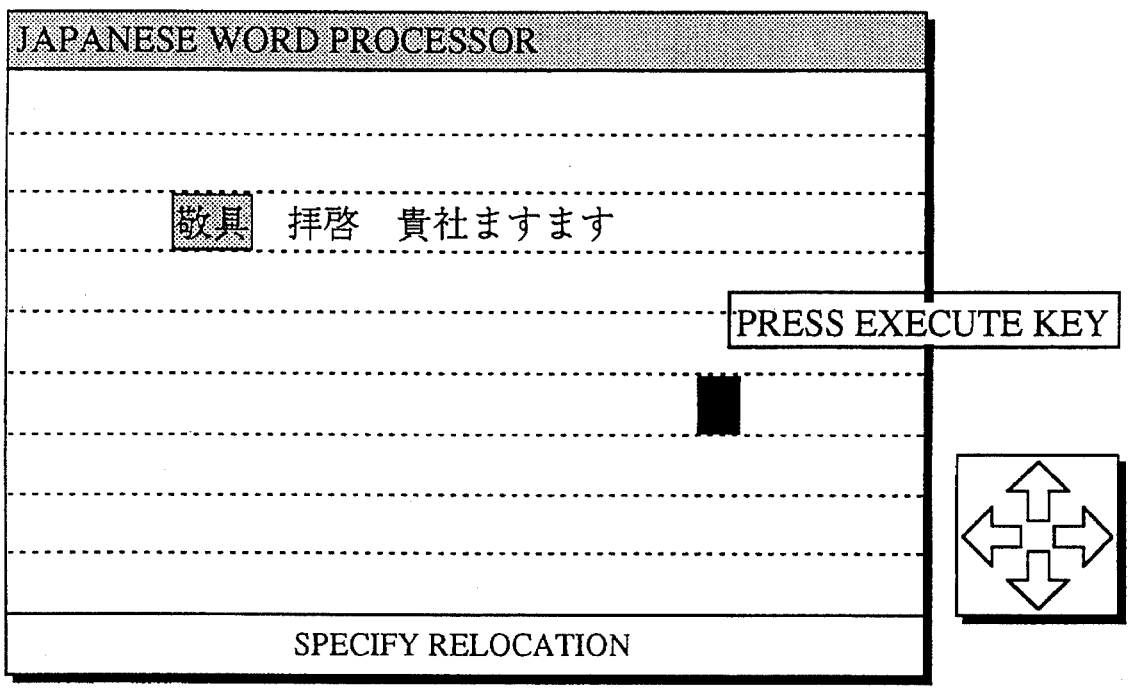
FIG. 32 a view showing a display of the guidance generated by the operation guidance generating unit of the second embodiment.

The messages are displayed at the end of the operation for the operation data C describing the message in the guidance description unit 301. The messages are displayed according to the message item (message font, message frame) in the style rule. For example, for the operation data C1 "PRESS FUNCTION KEY (MOVE)" in FIG. 24, the message (SELECT FUNCTION KEY(MOVE)) is displayed as is shown in FIG. 27. This message is displayed according to the message font specified in the style rule. Likewise, the message frame is displayed according to the data specified in the style rule:

shape: rectangle, color: black, line: solid, , line space: 2, location: (X–2 Y+2).

Thus, the display appears two lines below, two columns right from where the cursor currently locates.

Likewise, FIGS. 28, 29, 30, 31, and 32 respectively show that the messages for the operation data C2–C6: (SELECT "MOVE CHARACTER STRING" WITH CURSOR), (PRESS EXECUTE KEY), (SET STARTING AND ENDING POINTS), (INDICATE RELOCATION), and (PRESS EXECUTE KEY).

THIRD EMBODIMENT

Figure 33:
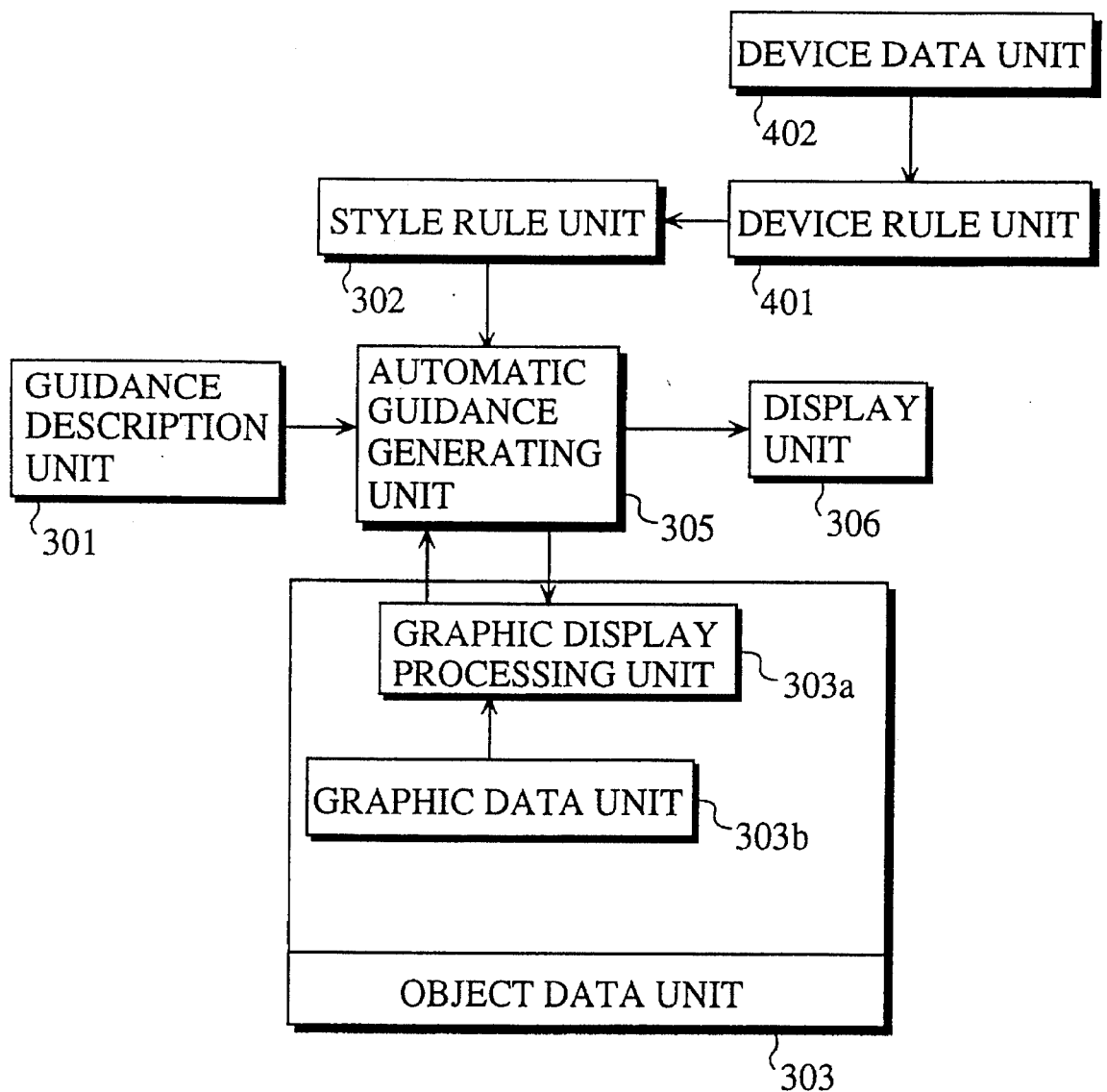
FIG. 33 is a block diagram showing the structure of an operation guidance generating unit in accordance with the third embodiment of the present invention.

Next, an explanation of the third embodiment will be given. FIG. 33 is a block diagram depicting the structure of an animated guidance generating unit in accordance with the third embodiment. Compared with the second embodiment, the animated guidance generating unit additionally includes a device rule unit 401 and a device data unit 402. The device rule unit 401 and device data unit 402 are added to supply data to display guidance corresponding to the specification of a data processor in which the operation guidance generating unit is incorporated.

The device data 402 stores the specification data of the components of the data processor as is shown in FIG. 36.

The device rule unit 401 stores the style rule corresponding to the specification of each component as is shown in FIG. 35.

Figure 37:
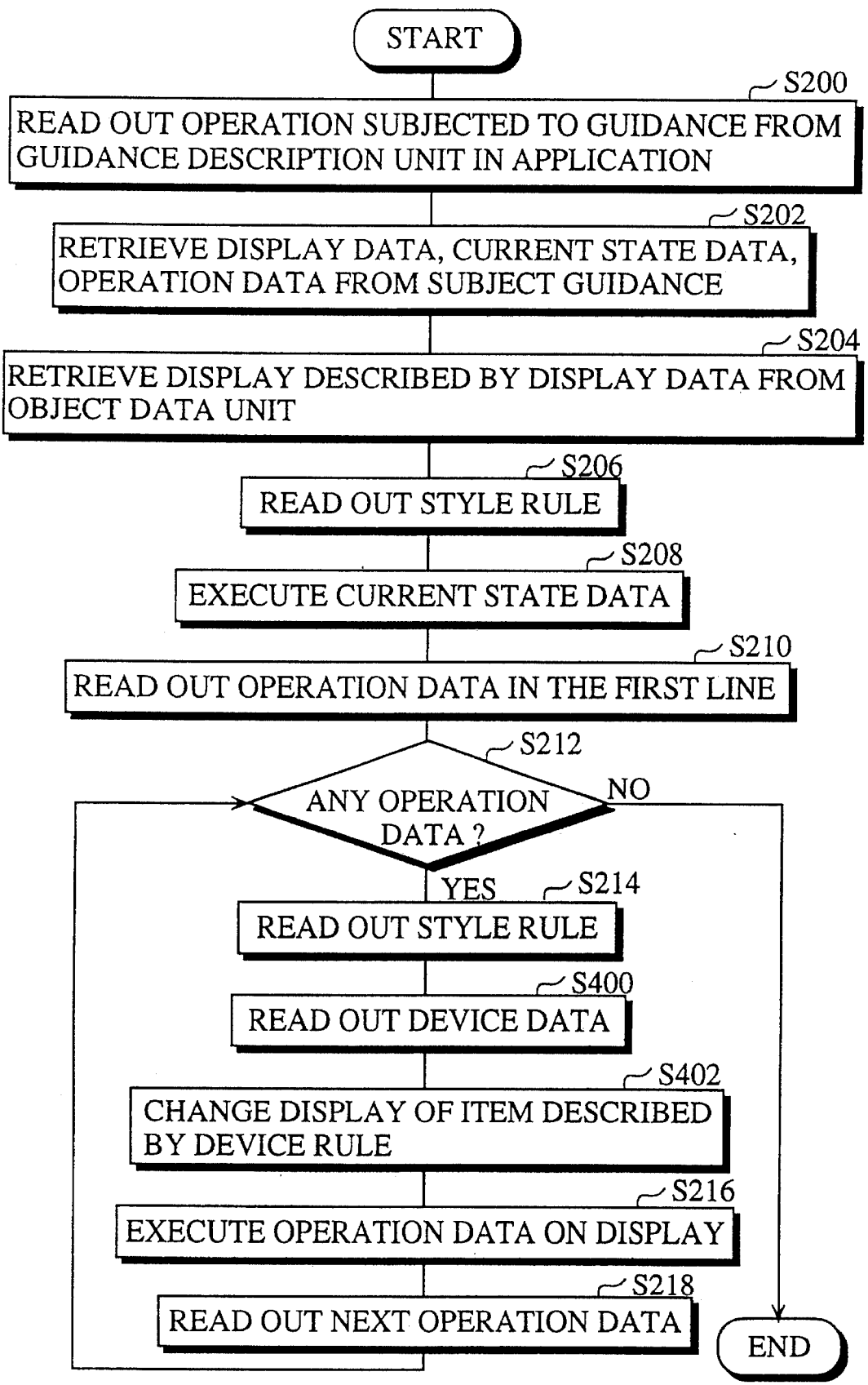
FIG. 37 is a flowchart detailing the operation procedure of the operation guidance generating unit of FIG. 33.
Figure 40:
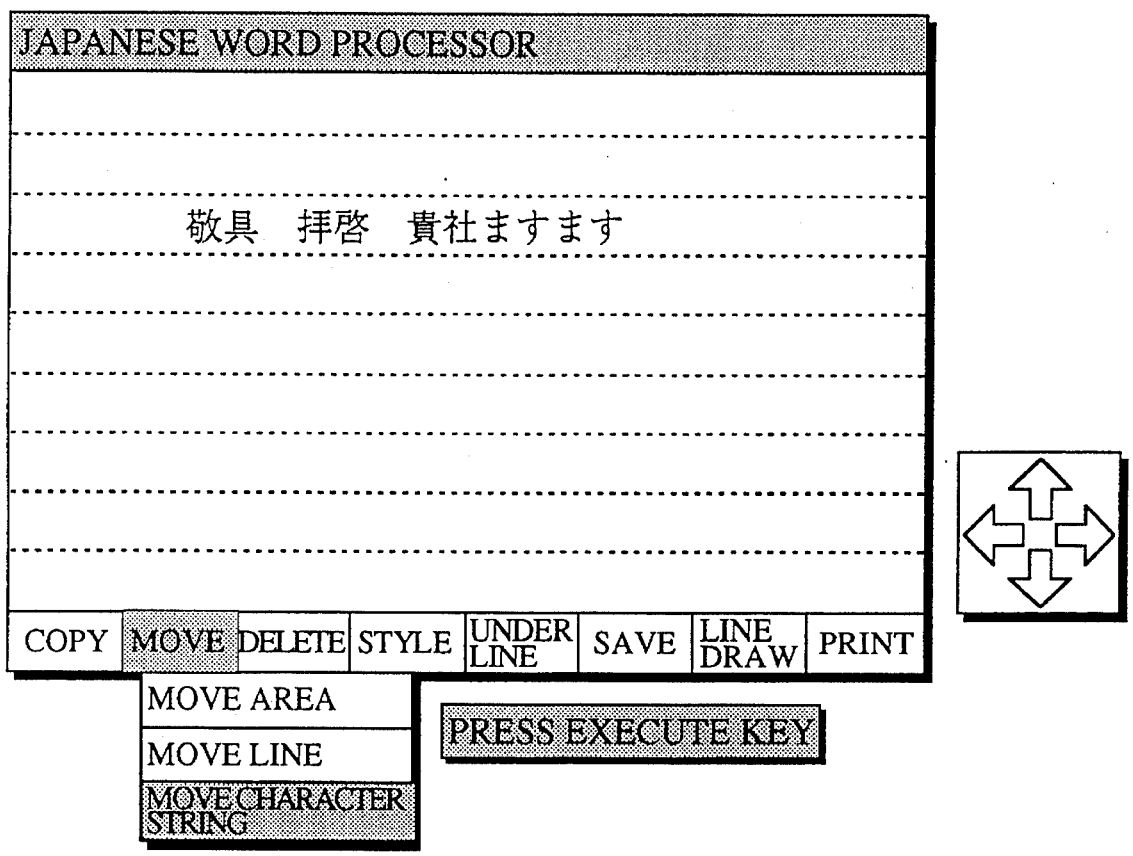
FIG. 40 is a view showing a display of the guidance generated by the operation guidance generating unit of the third embodiment.
Figure 41:
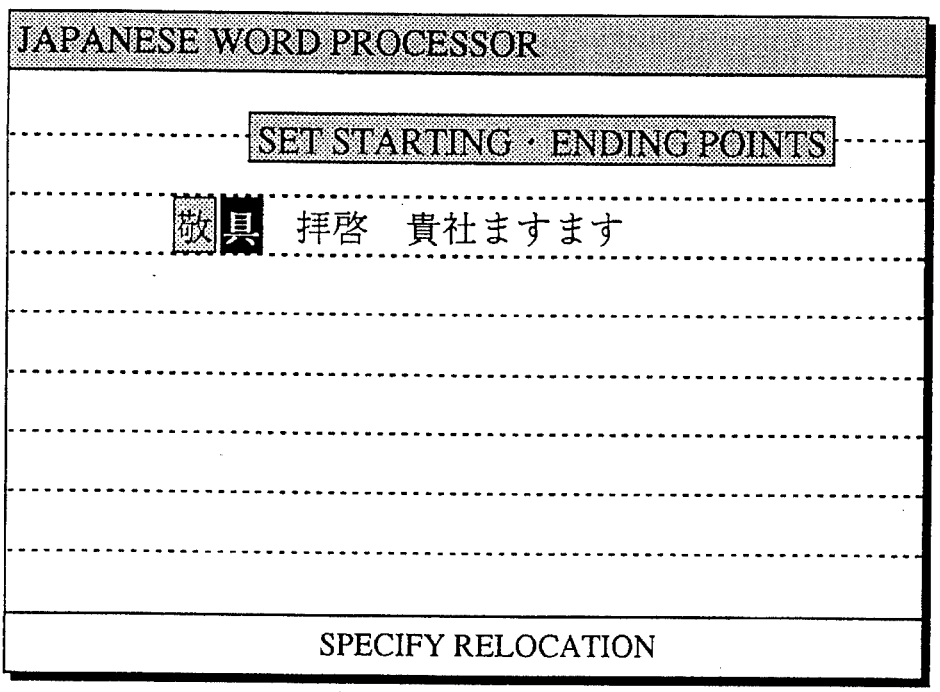
FIG. 41 is a view showing a display of the guidance generated by the operation guidance unit of the third embodiment.
Figure 42:
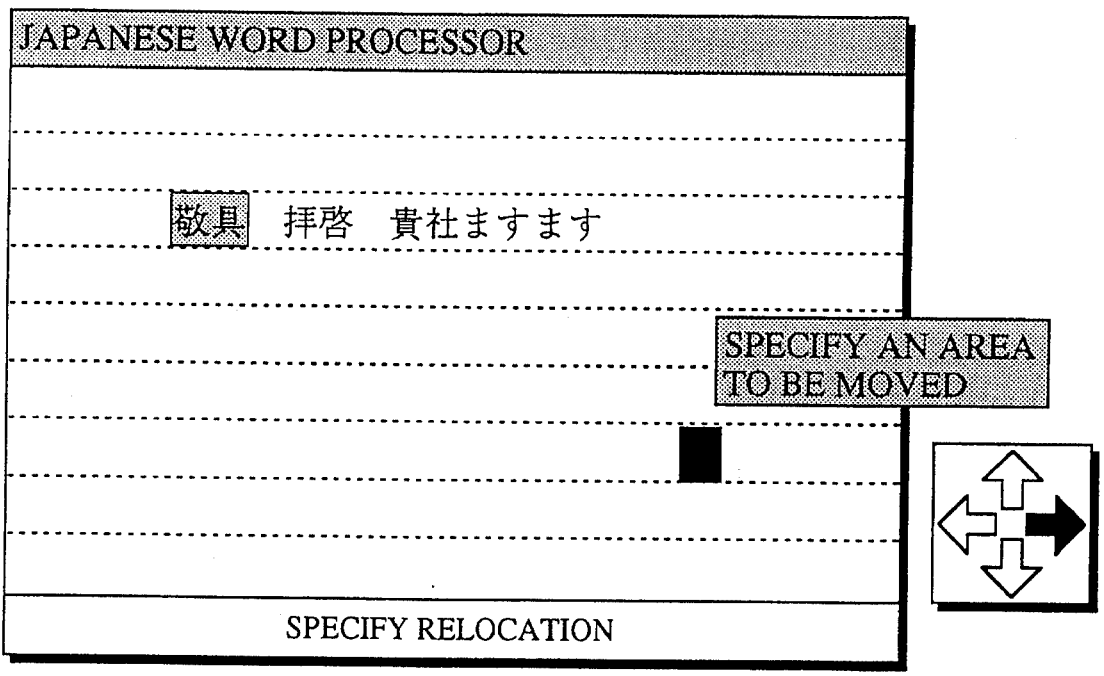
FIG. 42 is a view showing a display of the guidance generated by the operation guidance unit of the third embodiment.
Figure 43:
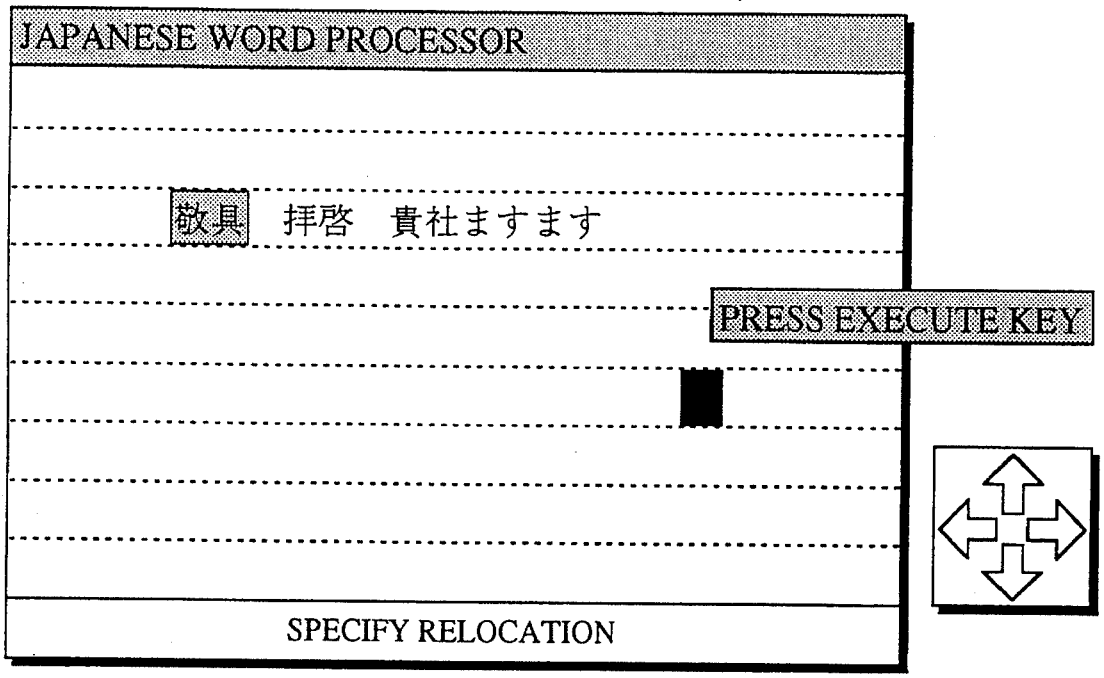
FIG. 43 is a view showing a display of the guidance generated by the operation guidance unit of the third embodiment.

FIG. 37 is a flowchart detailing the operation of the animated guidance generating unit of the third embodiment. Compared with the second embodiment, Steps 400, 402 are different, where the device data are read out for changing the style rule.

FIGS. 38–43 show the end display in this embodiment.

The operation of the animated guidance generating unit of the third embodiment will be explained in the following. The explanation of processing for the device rule and device data alone will be given; for the rest is identical with the second embodiment.

FIG. 34 shows an example case where the style rule specifies the color of the message frame and the inside color thereof is to be blue, while the animated guidance generating unit has a monochrome display monitor.

First, the device rule of the device rule unit 401 is read out in accordance with device data in the device data unit 402 (Step 400) to determine whether the data are to be displayed according to the format specified in the style rule. Given that the display monitor for the device data in FIG. 36 is monochrome, the frame of the message is changed to black, the inside color of the frame is cleared, and a display is modified with a net pattern according to the device rule in FIG. 35. Neither a mouse nor a speech generation device has been set in the device data; thus the mouse display and speech-output of the message will not be performed herein(Step 402). Note that the speech referred herein includes a sound as well. FIGS. 38–43 show the end display corresponding to FIGS. 27–32, respectively.

FOURTH EMBODIMENT

Figure 44:
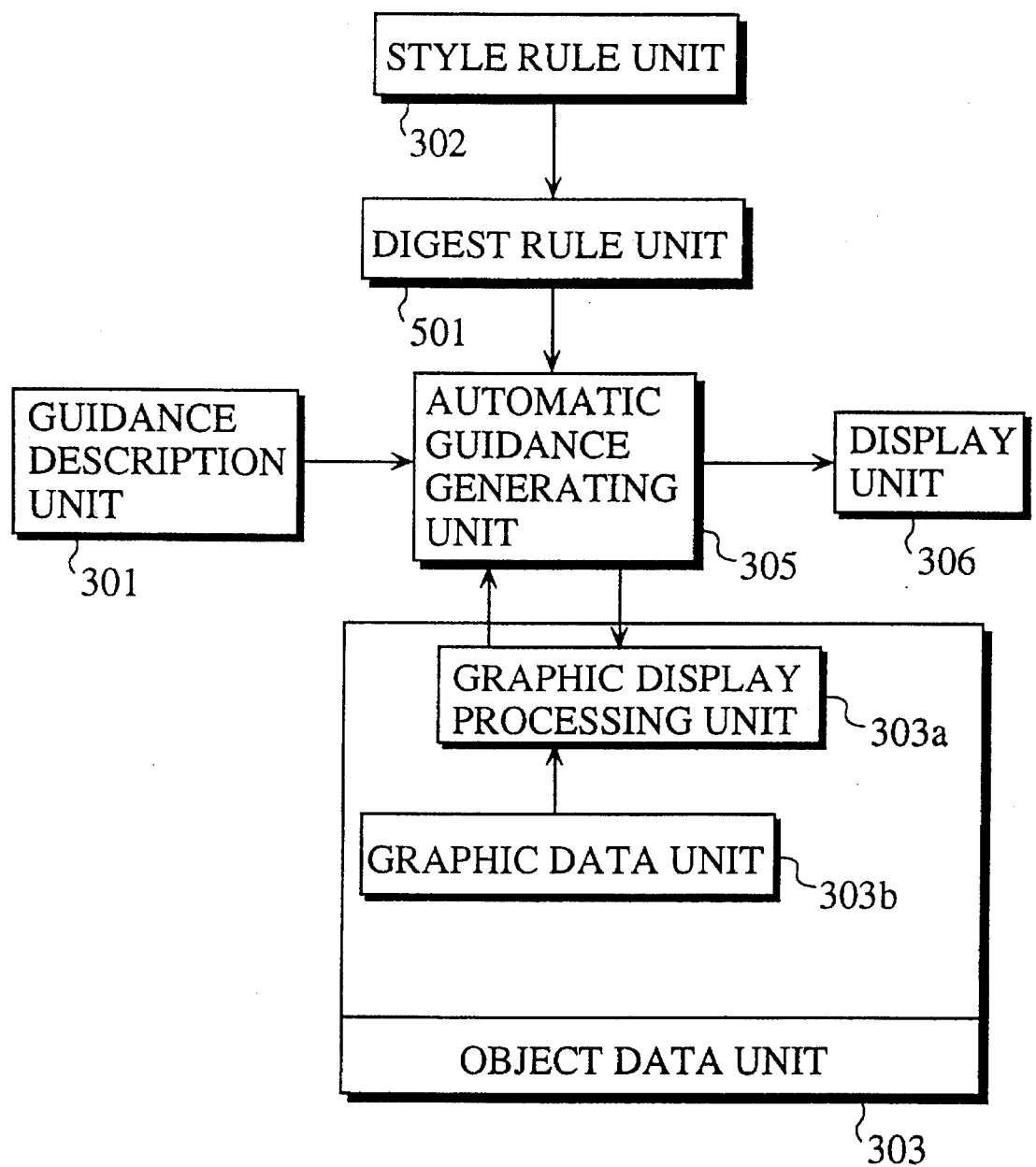
FIG. 44 is a block diagram showing the structure of an operation guidance generating unit in accordance with the fourth embodiment of the present invention.

Next, an animated guidance generating unit in accordance with the fourth embodiment will be explained. FIG. 44 is a block diagram depicting the structure of the animated guidance generating unit in accordance with the fourth embodiment. Compared with the second embodiment, the animated guidance generating unit additionally includes a digest rule unit 501. The digest rule 501 is used when the user wishes to change the guidance partially without changing the contents of the style rule unit 302. The function and the operation of the digest rule will be explained using the guidance for the character-string-moving operation in the Japanese word processor application as an example like in the second embodiment.

Figure 46:
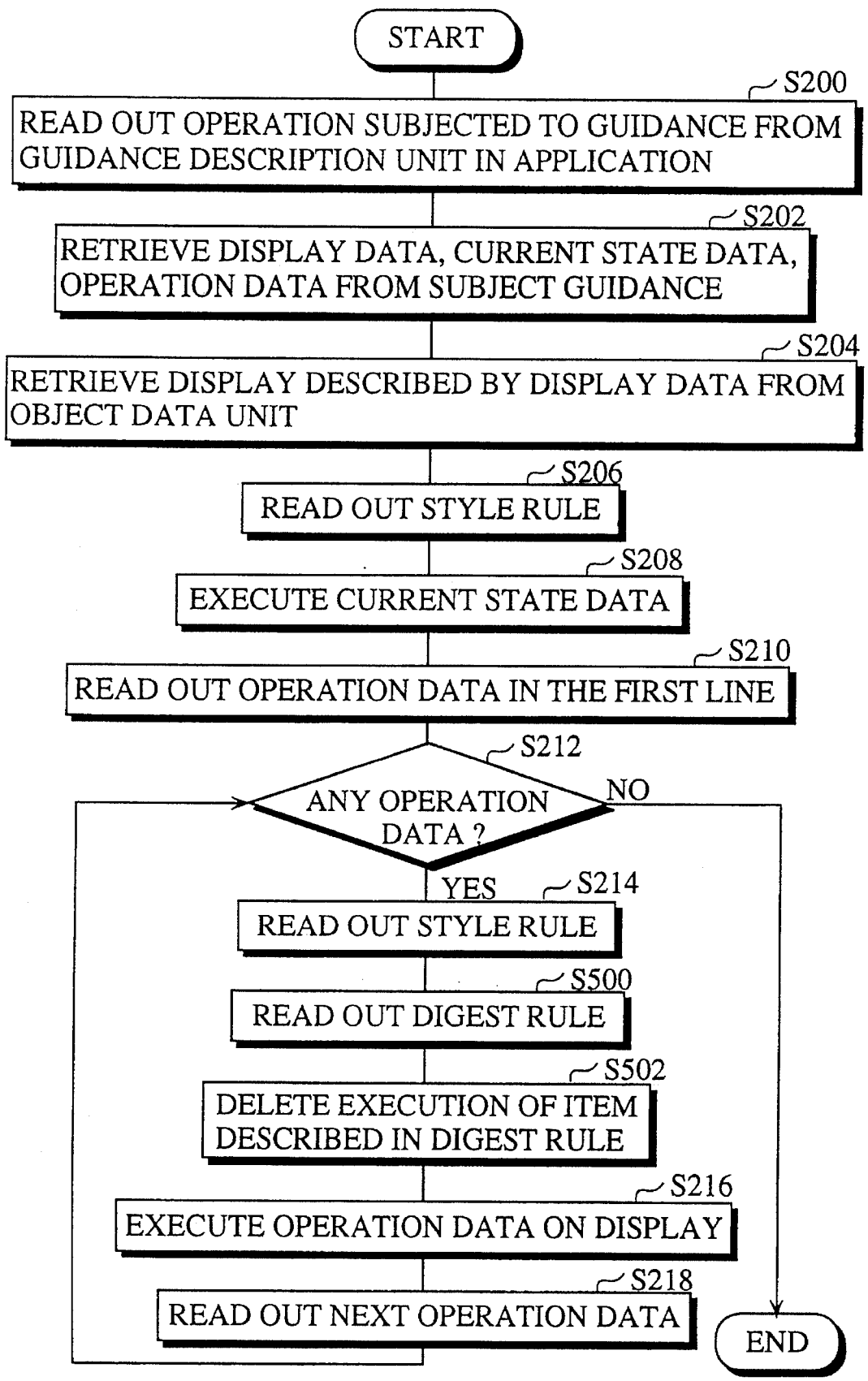
FIG. 46 is a flowchart detailing the operation procedure of the operation guidance generating unit of the fourth embodiment.
Figure 47:
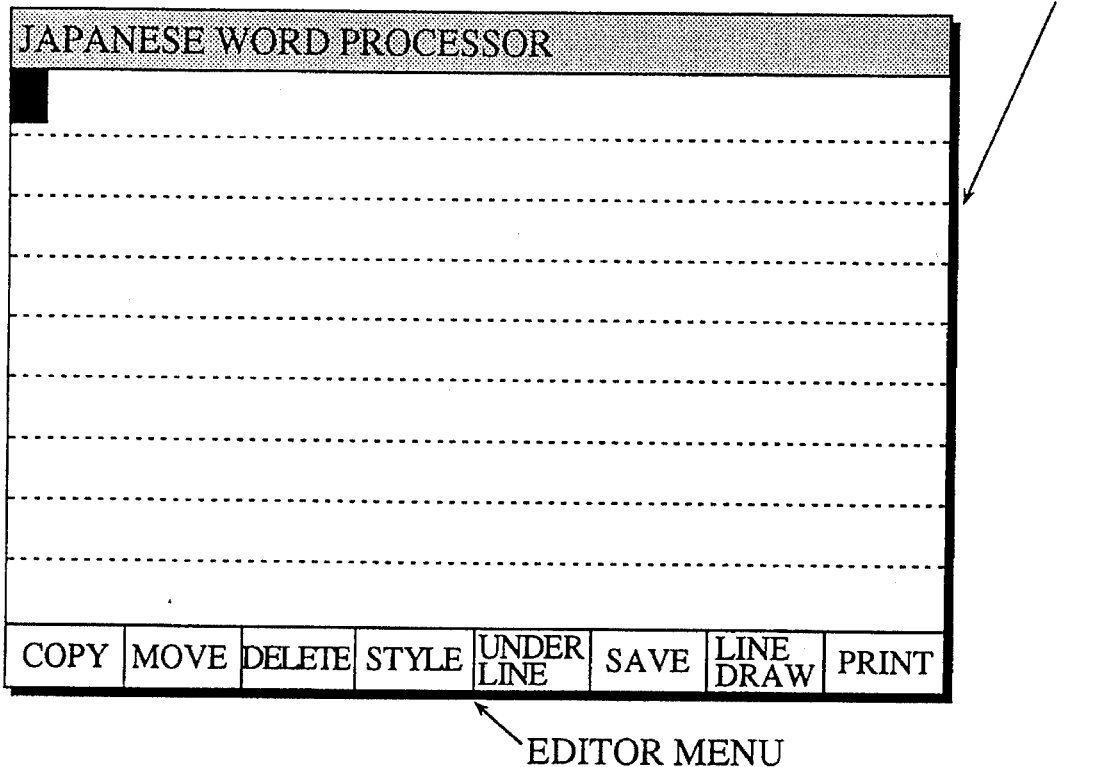
FIG. 47 is a view showing a display of the guidance generated by the operation guidance unit of the fourth embodiment.
Figure 48:
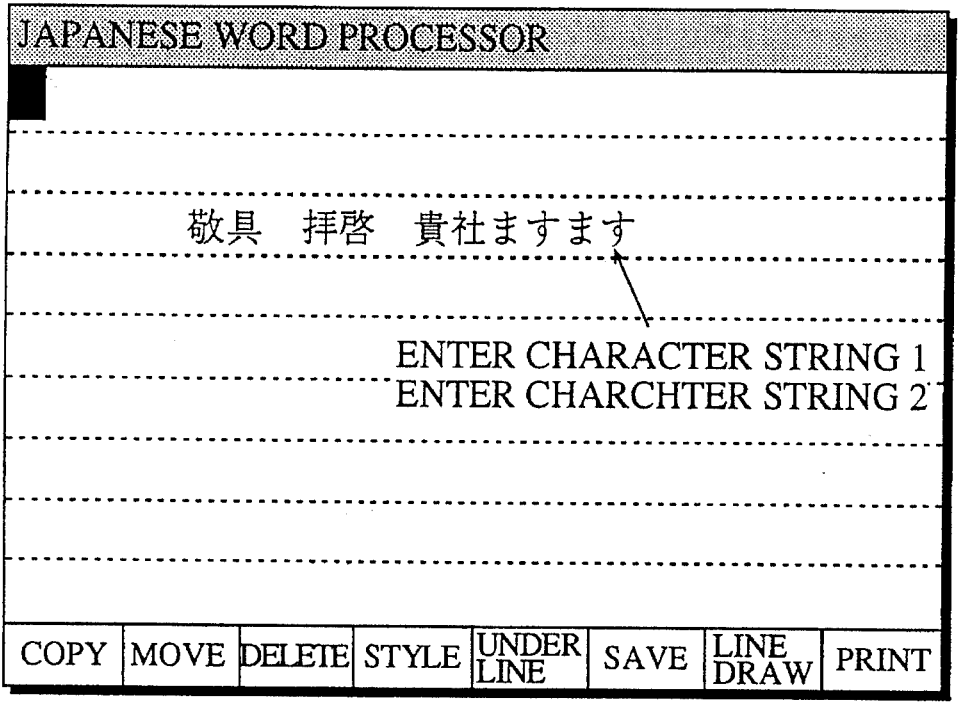
FIG. 48 is a view showing a display of the guidance generated by the operation guidance unit of the fourth embodiment.
Figure 49:
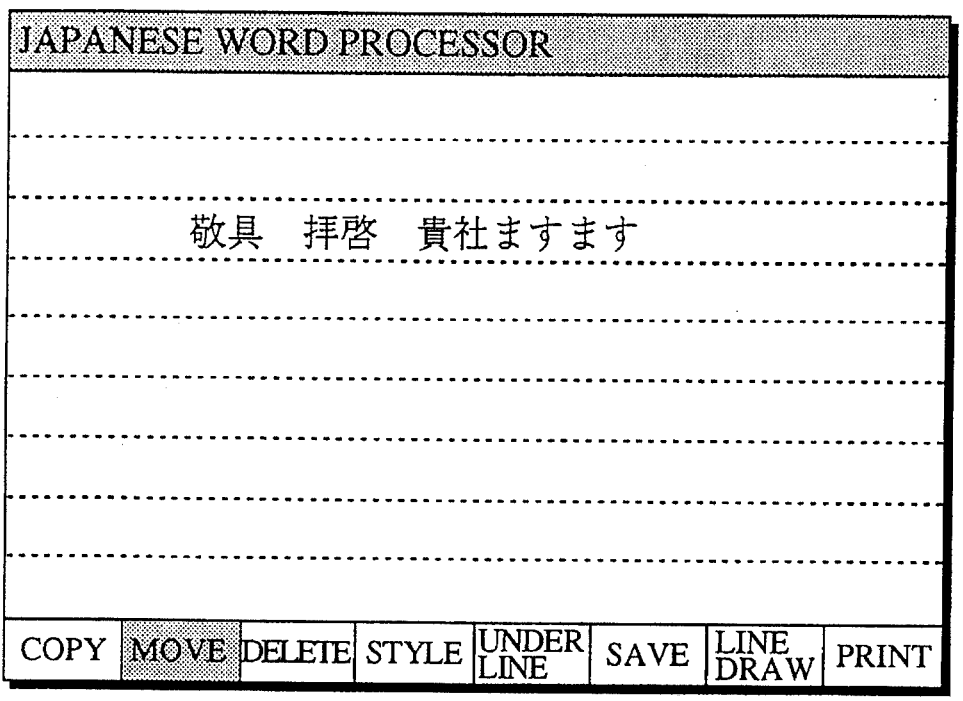
FIG. 49 is a view showing a display of the guidance generated by the operation guidance unit of the fourth embodiment.
Figure 50:
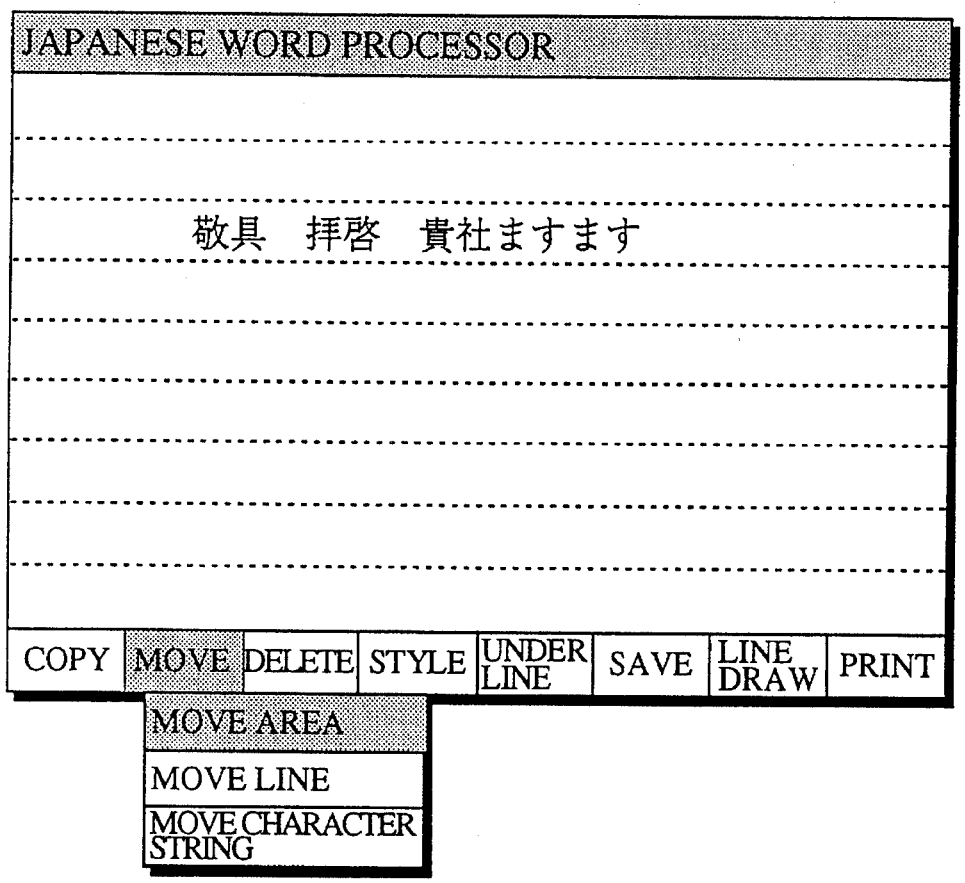
FIG. 50 is a view showing a display of the guidance generated by the operation guidance unit of the fourth embodiment.
Figure 51:
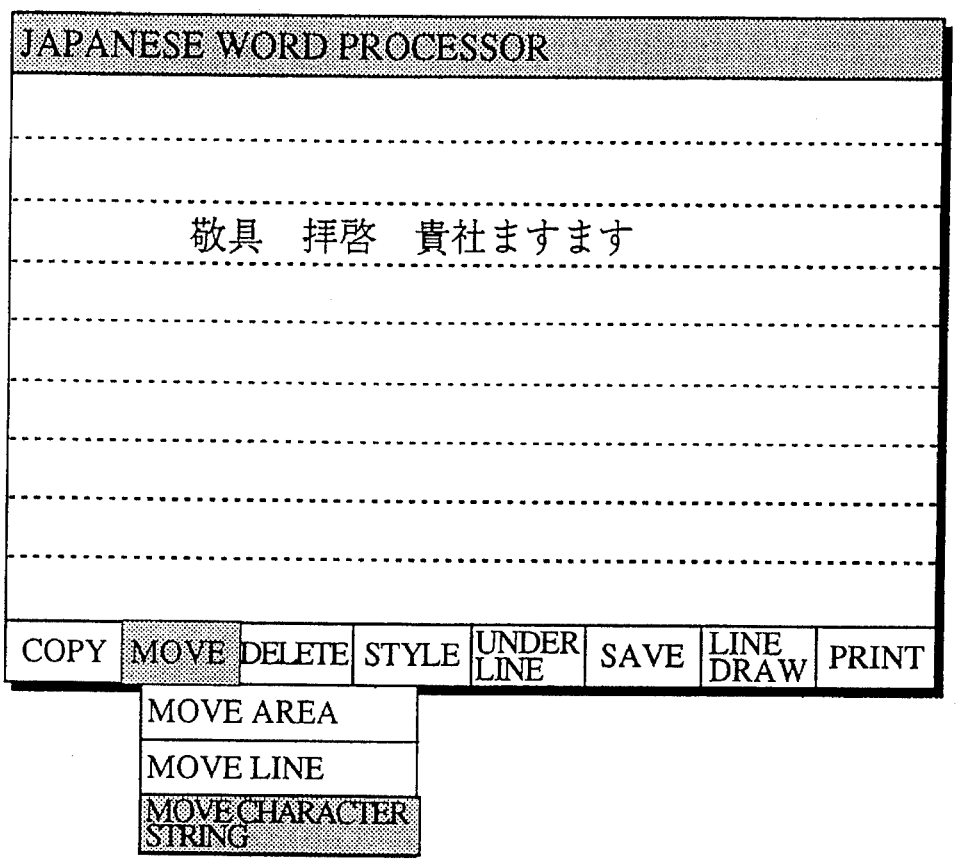
FIG. 51 is a view showing a display of the guidance generated by the operation guidance unit of the fourth embodiment.
Figure 52:
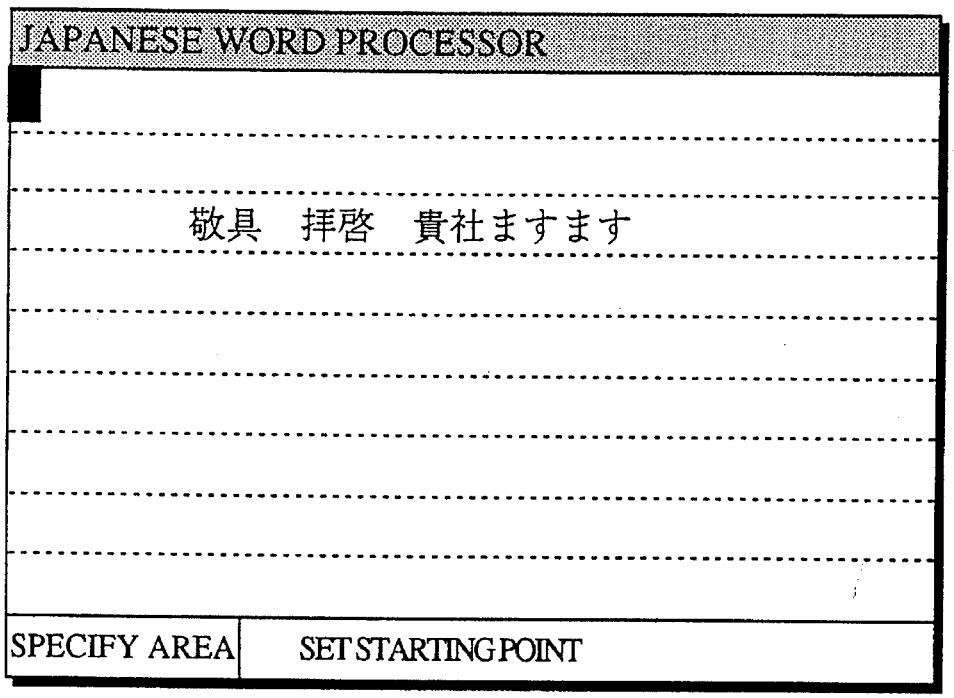
FIG. 52 is a view showing a display of the guidance generated by the operation guidance unit of the fourth embodiment.
Figure 53:
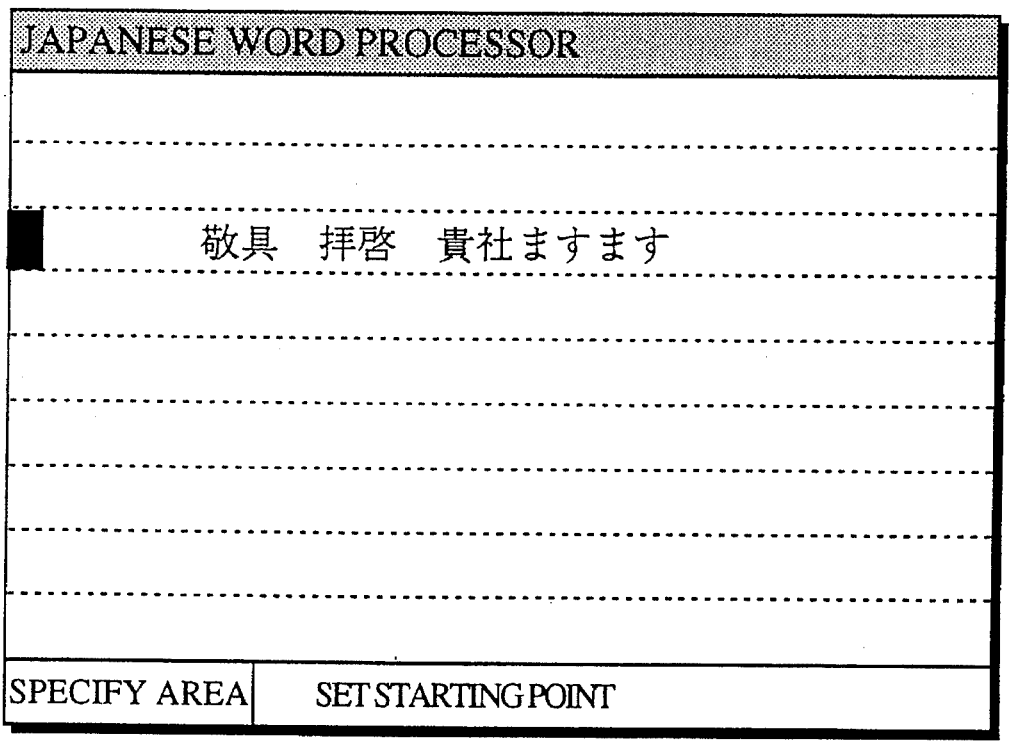
FIG. 53 is a view showing a display of the guidance generated by the operation guidance unit of the fourth embodiment.
Figure 54:
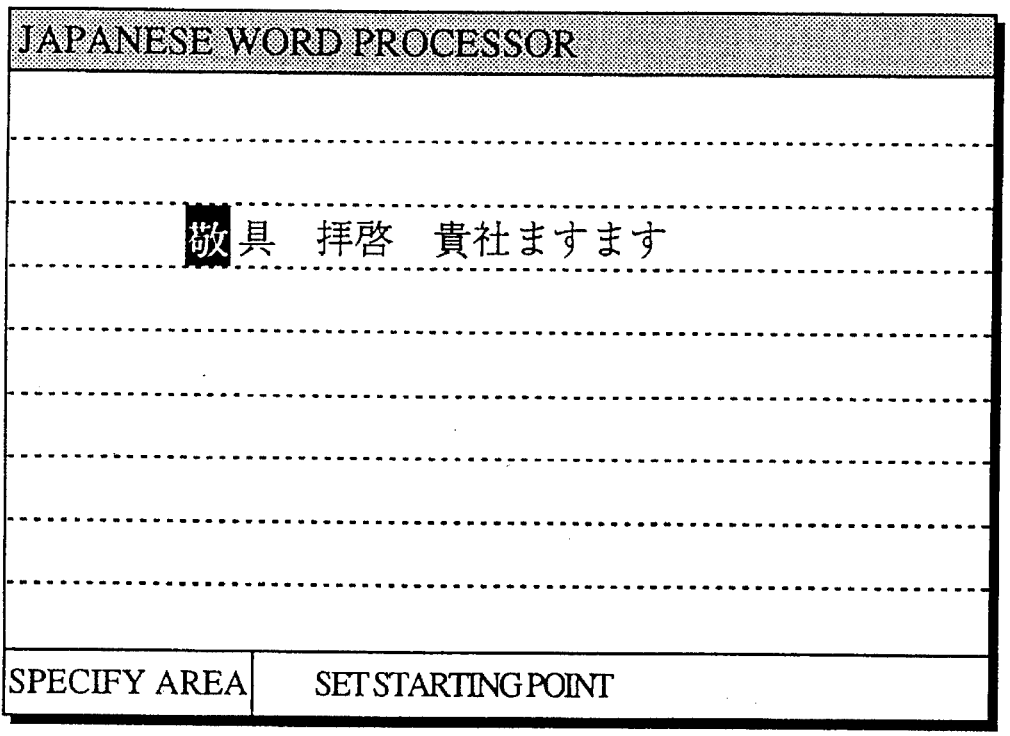
FIG. 54 is a view showing a display of the guidance generated by the operation guidance unit of the fourth embodiment.
Figure 55:
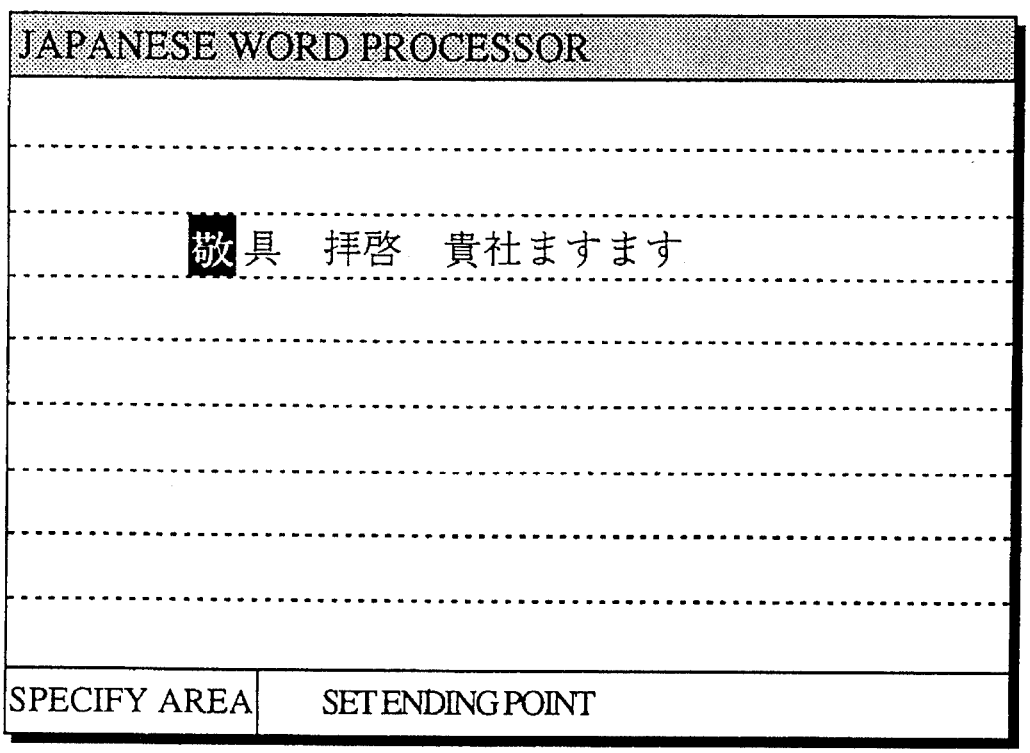
FIG. 55 is a view showing a display of the guidance generated by the operation guidance unit of the fourth embodiment.
Figure 56:
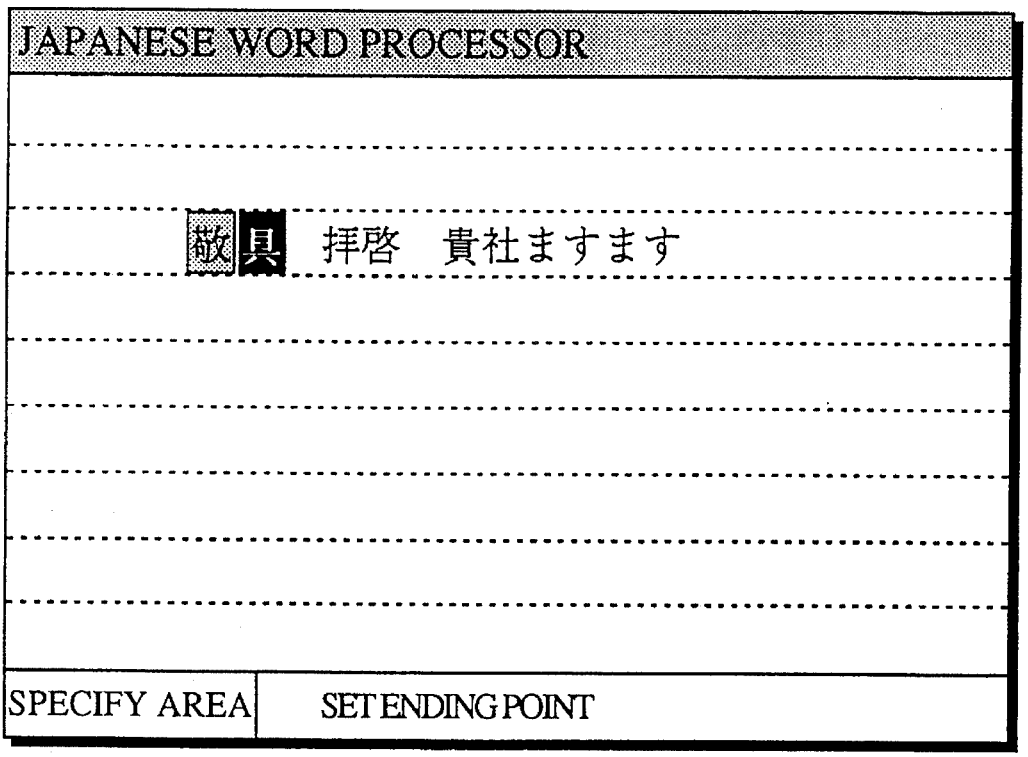
FIG. 56 is a view showing a display of the guidance generated by the operation guidance unit of the fourth embodiment.
Figure 57:
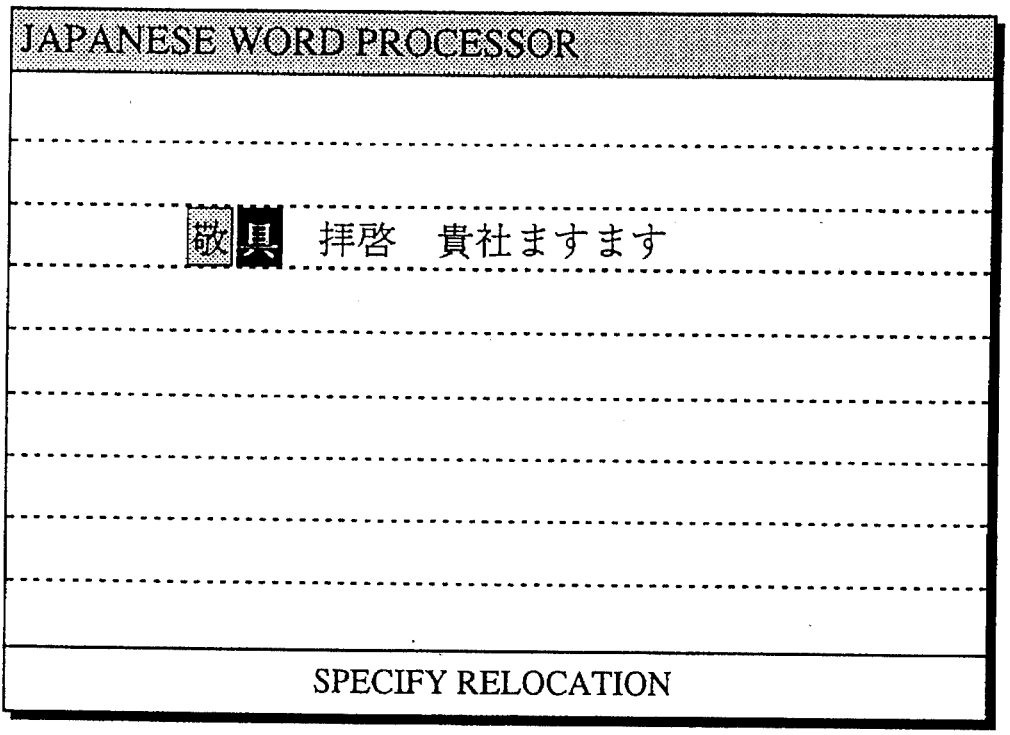
FIG. 57 is a view showing a display of the guidance generated by the operation guidance unit of the fourth embodiment.
Figure 58:
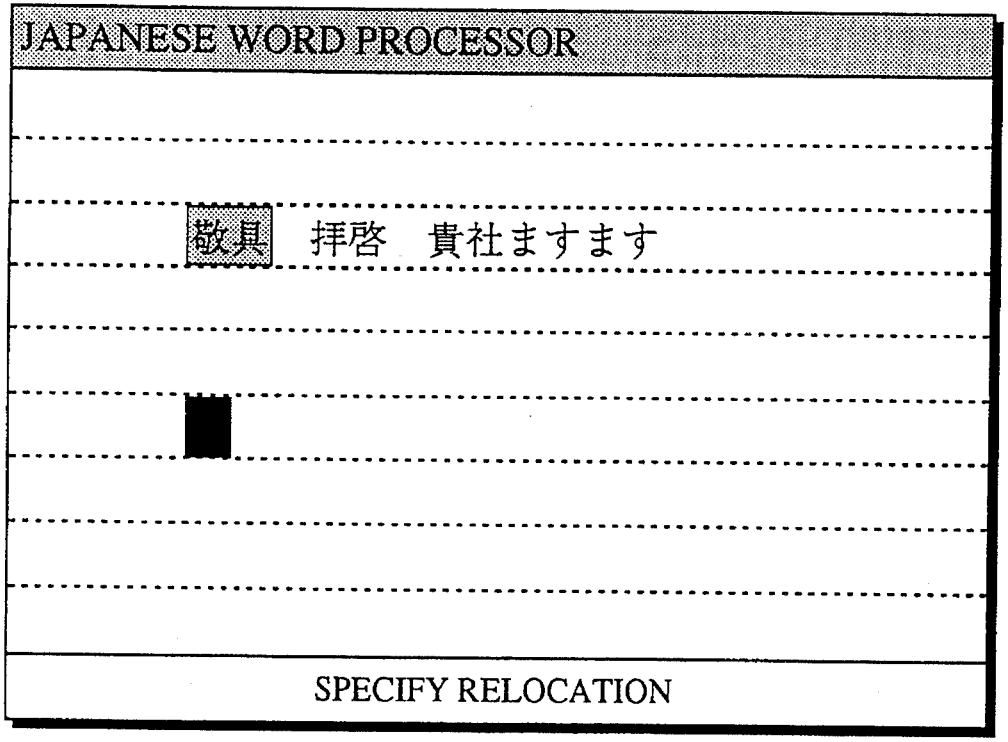
FIG. 58 is a view showing a display of the guidance generated by the operation guidance unit of the fourth embodiment.
Figure 59:
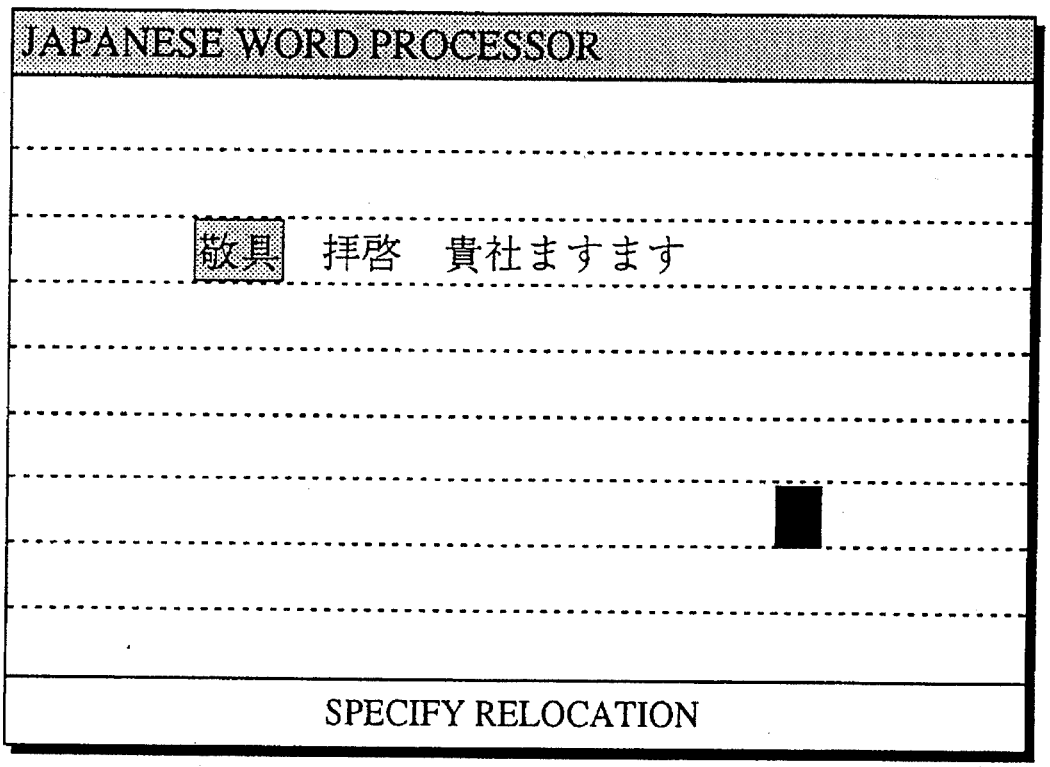
FIG. 59 is a view showing a display of the guidance generated by the operation guidance unit of the fourth embodiment.
Figure 60:
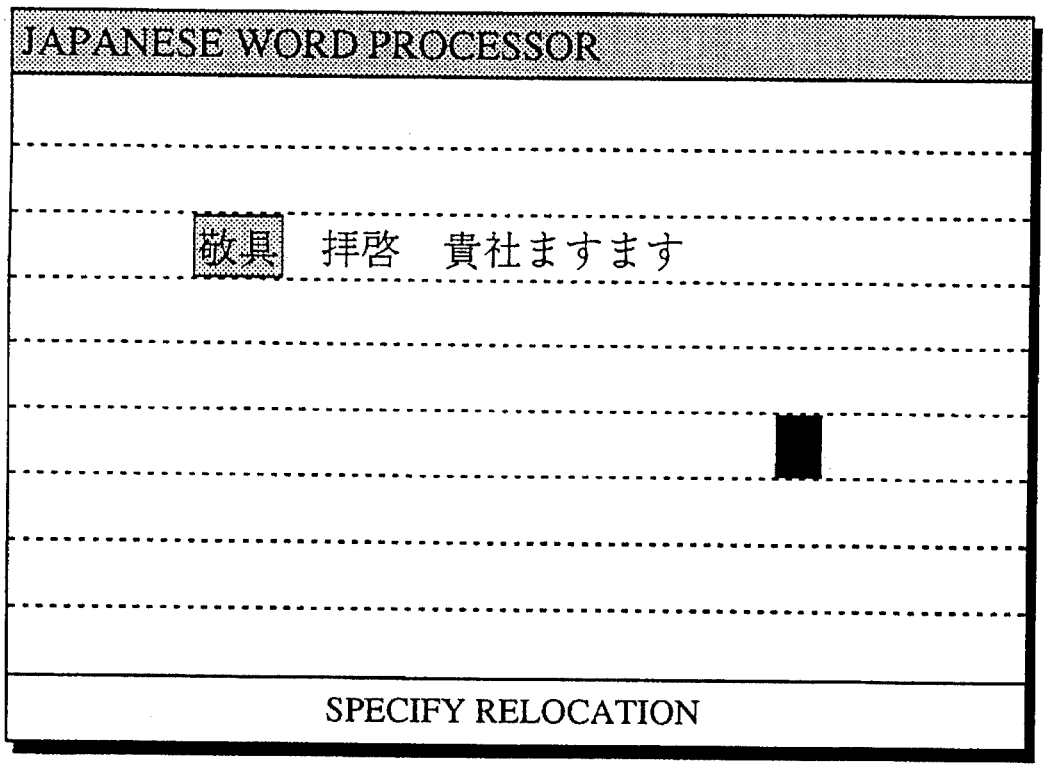
FIG. 60 is a view showing a display of the guidance generated by the operation guidance unit of the fourth embodiment.
Figure 61:
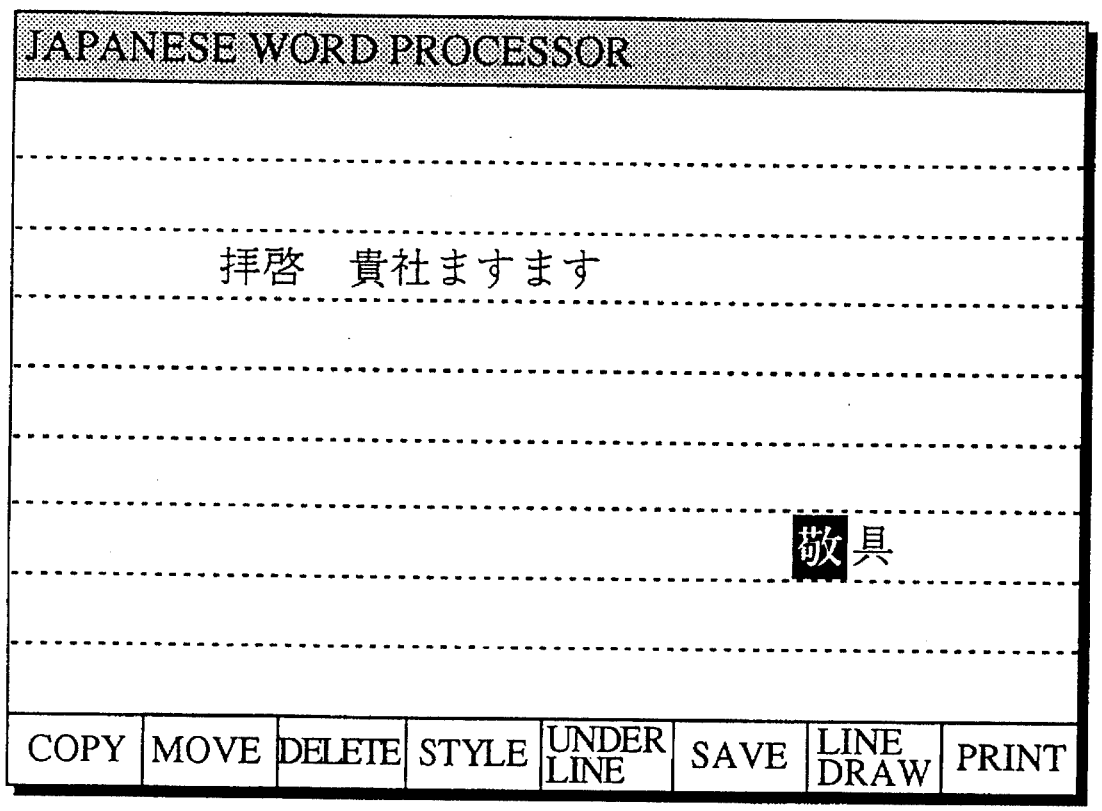
FIG. 61 is a view showing a display of the guidance generated by the operation guidance unit of the fourth embodiment.

FIG. 46 is a flowchart detailing the operation of the animated guidance generating unit of the fourth embodiment. Compared with that of the second embodiment shown in FIG. 26, Steps 500, 502 are different, where the operation of the digest rule unit 501 is directed.

Figure 45:
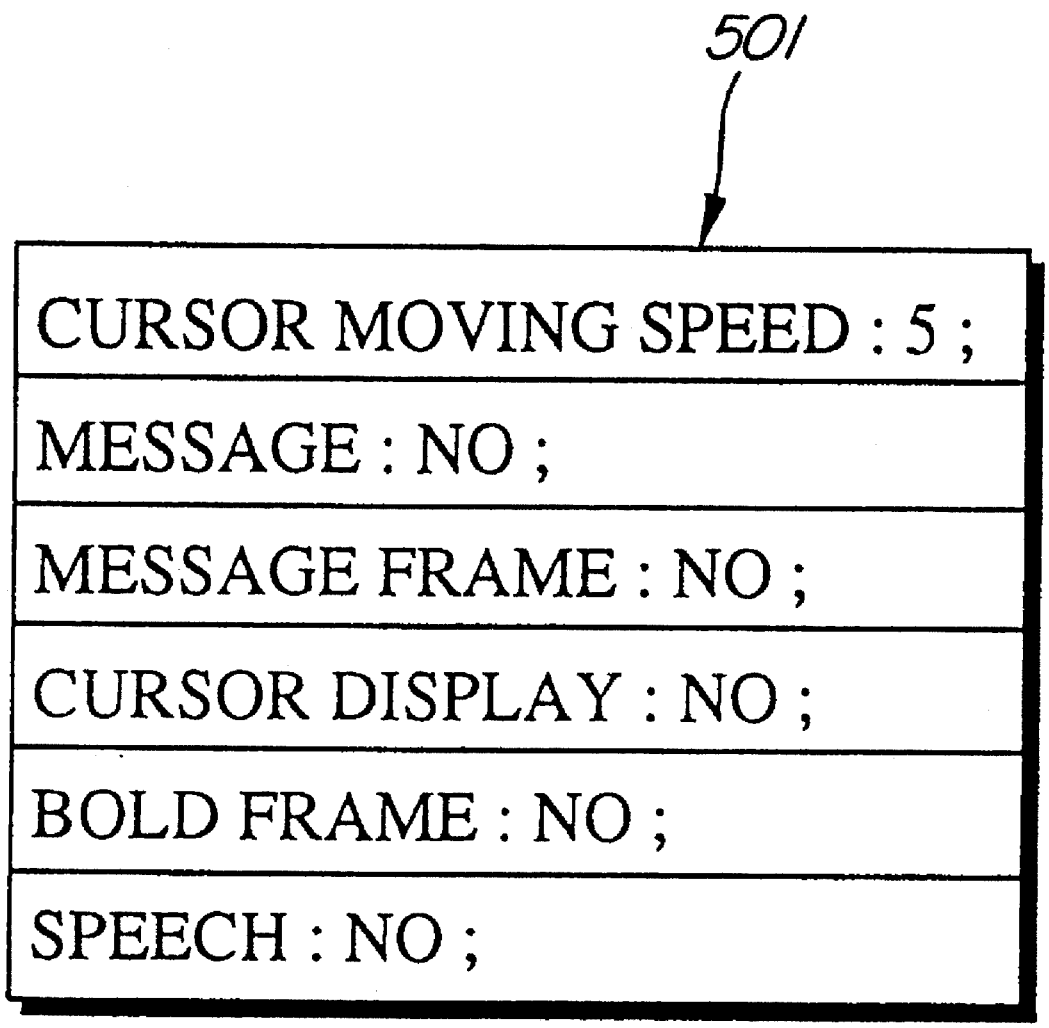
FIG 45 is an illustration showing an example of the contents in a digest rule unit of the operation guidance generating unit of FIG. 44.

FIG. 45 shows the contents of the digest rule unit 501. The contents therein are the data to change the contents in the style rule unit 302 shown in FIG. 34. More precisely, the cursor moving speed initially set at three frames per second in FIG. 34 is changed to five frames per second by the digest rule shown in FIG. 45.

The message display is specified in the style rule, it can be changed so that the messages will not be displayed by the digest rule. Likewise, the cursor display and bold frame will be changed, so that they will not be displayed. FIGS. 47–61 show the end display.

According to the fourth embodiment, the display format of the guidance can be changed without changing the contents in the style rule, making it possible to change a slight, or a temporarily change efficiently.

Note that each of the first through fourth embodiments can be combined. For example, the digest rule unit 501 of the fourth embodiment can be included in the animated guidance generating unit of the first embodiment, or the device rule unit 401 and device data unit 402 of the third embodiment can be further included.

The guidance for the character-string-moving operation in the Japanese word processor application is used as the example. However, it should be noted that the guidance generating unit can automatically generate guidance for any application.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An operation guidance generating unit for generating guidance image data to create animated guidance images explaining an operation procedure of a data processor on a screen of a display unit, the operation guidance generating unit comprising:

a guidance description means describing the operation procedure for updating guidance images, thus enabling a user to operate the data processor;

an object data storage means including means for storing image data for each element necessary to generate the guidance images on the screen of the display unit and a graphic display processing means for editing image data;

a style rule storage means for storing display format data for an image area where a display format is amendable, the area being included in the guidance images; and a guidance data generating means for generating the guidance images by selecting certain image data from the object data storage means in accordance with each procedure described in the guidance description means and subsequently using the graphic display processing means to edit the selected image data based on the display format data stored in the style rule storage means.

2. The operation guidance generating unit of claim 1, wherein the guidance description means holds title data representing each procedure for which guidance is available, data for each guidance image which is to be updated, and operation instruction data necessary for updating the image;

wherein the object data storage means stores the image data for displaying the guidance image corresponding to the operation procedure in relation with a graphic display processing program for generating the guidance image using the image data; and wherein the style rule storage means holds the display format data for changing the image data supplied from the object data storage means in correspondence to the operation instruction data held in the guidance description means.

3. The operation guidance generating unit of claim 2, wherein the object data storage means includes:

a graphic display processing unit for storing the title data corresponding to each operational procedure held in the guidance description means, for storing data used for identifying the image data necessary to generate the guidance image corresponding to each operational procedure, and for storing the graphic display processing program which generates the image data of the guidance image using the image-identifying data; and a graphic data unit for storing the title data corresponding to the image-identifying data stored in the graphic display processing unit and the image data necessary to generate the guidance image corresponding to the title data.

4. The operation guidance generating unit of claim 3, further comprising:

a format data changing means for changing the display format data selected from the style rule storage means to be delivered to the guidance data generating means, and wherein the guidance data generating means generates the guidance image based on the display format data changed by the format data changing means.

5. The operation guidance generating unit of claim 4, wherein the format data changing means includes:

a device data unit for storing a specification of each component of the operation guidance generating unit; and a device rule unit for changing the format data selected from the style rule storage means based on data in the specification storage unit.

6. The operation guidance generating unit of claim 5, wherein the guidance description means holds the operation procedure in relation with message data which explain the operation procedure to the user; and the guidance data generating means generates the guidance image including the message data supplied from the guidance description means.

7. The operation guidance generating unit of claim 6, further comprising a display means for displaying the guidance image generated by the guidance data generating means.

8. The operation guidance generating unit of claim 1, further comprising:

a format data changing means for changing the display format data selected from the style rule storage means to be delivered to the guidance data generating means, and wherein the guidance data generating means generates the guidance image based on the display format data changed by the format data changing means.

9. The operation guidance generating unit of claim 8, wherein the format data changing means includes:

a device data unit for storing a specification of each component of the operation guidance generating unit; and a device rule unit for changing the format data selected from the format data storage means based on data in the specification storage unit.

10. The operation guidance generating unit of claim 1, wherein the guidance description means holds the operation procedure in relation with message data which explain the operation procedure to the user; and the guidance data generating means generates the guidance image including the message data supplied from the guidance description means.

11. The operation guidance generating unit of claim 1, further comprising a display means for displaying the guidance image generated by the guidance data generating means.

12. A method for producing guidance images describing an operation procedure of a data processor, thereby aiding a user in the operation of the data processor, the method using a guidance description unit for describing an operation procedure for updating guidance images on a screen of a display unit, object data unit for storing image data for each element needed to generate the guidance images and for storing graphic display processing program, and a style rules storage unit for storing display format data for an image area where a display format is amendable, the area being included in the guidance images generated from the image data stored in the object data storage unit, the method of generating the guidance images comprising the steps of:

selecting operation instruction data indicating the operation procedure from the guidance description unit;

selecting the image data needed to generate the guidance images and the graphic display processing program from the object data storage unit;

selecting the display format data from the style rules storage unit; and generating the guidance images by editing certain image data based on the display format data selected from the style rules image data storage unit in accordance with each operation procedure described in the guidance description unit.

13. The method of claim 12, further including a step of changing the display format data selected from the style rules storage unit with change data for changing the display format data stored in a digest rule storage unit.

14. A method of generating operation guidance that generates data for animated guidance images explaining an operation procedure of a data processor, the method comprising the steps of:

storing image data for each element consisting of image and an image data processing means in advance, the image data for each element being necessary to generate the guidance image;

generating and storing display format data for an image area where a display format is amendable among guidance images generated with the stored image data;

describing an operation procedure for updating the guidance images in accordance with a procedure a user is to follow; and generating the guidance image by selecting certain image data from the stored image data in accordance with each operation procedure described and subsequently editing the selected image data based on the stored display format data.

* * * * *